United States Patent [19]

Hodgson

[11] Patent Number: 4,911,543
[45] Date of Patent: Mar. 27, 1990

[54] MICROSCOPE VIEWING APPARATUS FOR VIEWING A SPECIMEN IMAGE AND AN OPTICAL OVERLAY PATTERN IMAGE IN A COMPARISON MANNER

[76] Inventor: R. W. Hodgson, Box 55516, Sherman Oaks, Calif. 91413

[21] Appl. No.: 200,535

[22] Filed: May 31, 1988

[51] Int. Cl.$^4$ .................. G02B 21/18; G02B 21/06; G02B 27/34; G02B 9/08
[52] U.S. Cl. .................. 350/508; 350/174; 350/523; 356/393; 358/93
[58] Field of Search ............ 350/508, 523, 266, 273, 350/169, 172, 174; 356/393, 397, 388, 391, 392, 395, 398; 358/93

[56] References Cited

U.S. PATENT DOCUMENTS

| | | | |
|---|---|---|---|
| 2,765,704 | 10/1956 | Mottu | 356/393 |
| 4,242,703 | 12/1980 | Tsuboshima et al. | 358/93 |
| 4,303,340 | 12/1981 | Hoffman | 350/508 |

Primary Examiner—Rodney B. Bovernick
Assistant Examiner—Ronald M. Kachmarik

[57] ABSTRACT

In a microscope viewing apparatus for viewing a specimen image, the provision of microscope viewing apparatus including a microscope eyepiece lens for focusing on a focusing plane at or above a specimen support panel and coincident with a desired viewing plane of a real microscopic specimen positioned therein, arranged to generate a specimen image, and the further provision of separate overlay pattern image-generating apparatus arranged to optically effectively generate a desired type, shape and size of optical overlay pattern and image, and the further provision of optical-image-mixing and combining apparatus arranged to receive the specimen image and the optical overlay pattern image and to effectively mix and combine same into desired selectively optically alignedly effectively centered and superimposed relationship to form a resultant effectively visually composite image output for effective viewing by the microscope viewing apparatus. In one preferred form, the foregoing basic concept is additionally provided with effective alternating-image-negating chopper apparatus cooperating with the optical-image-mixing and combining apparatus and/or the generating apparatus producing the specimen image and/or the overlay pattern image to cause same to be visually alternately present in the effectively composite image output with the alternating rate being such that the two images can be effectively visually compared.

16 Claims, 8 Drawing Sheets

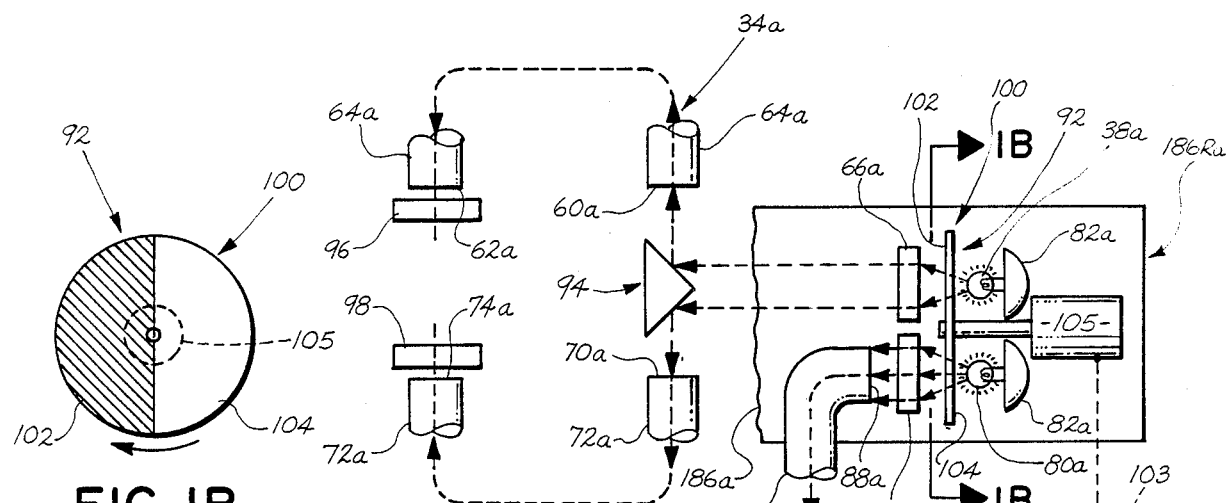
FIG. 1B
FIG. 1A
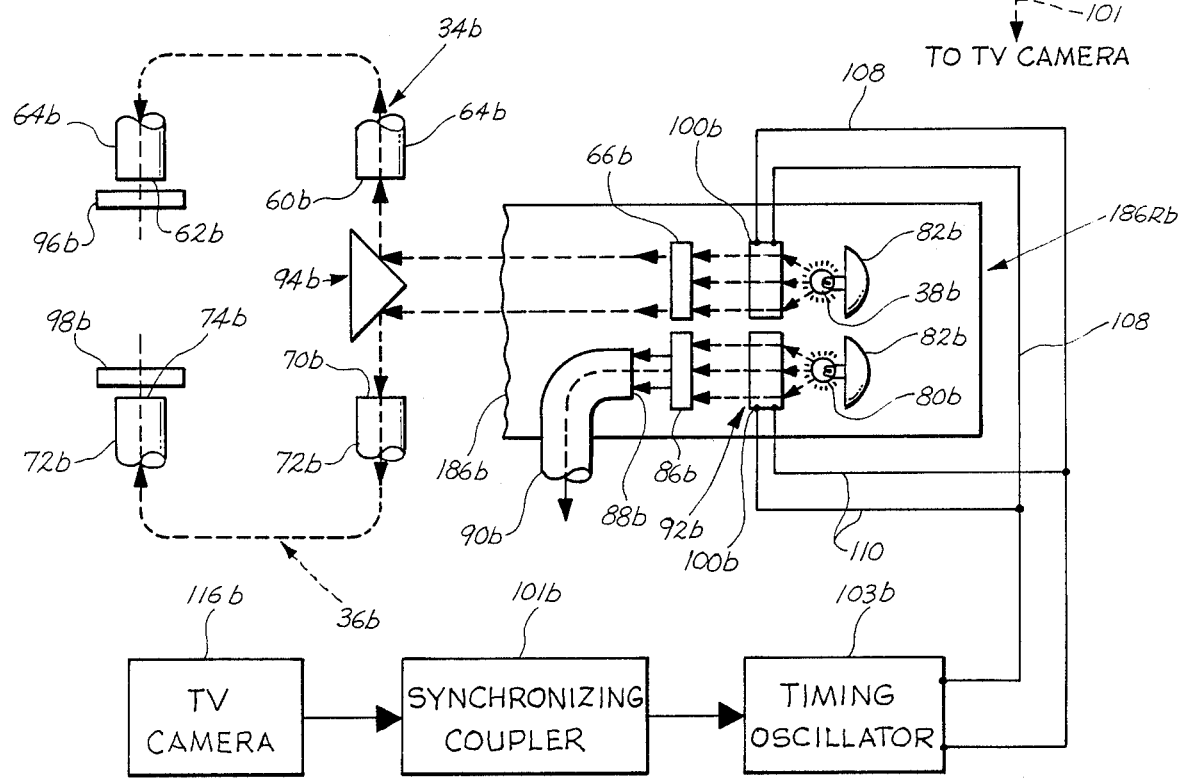
FIG. 1C

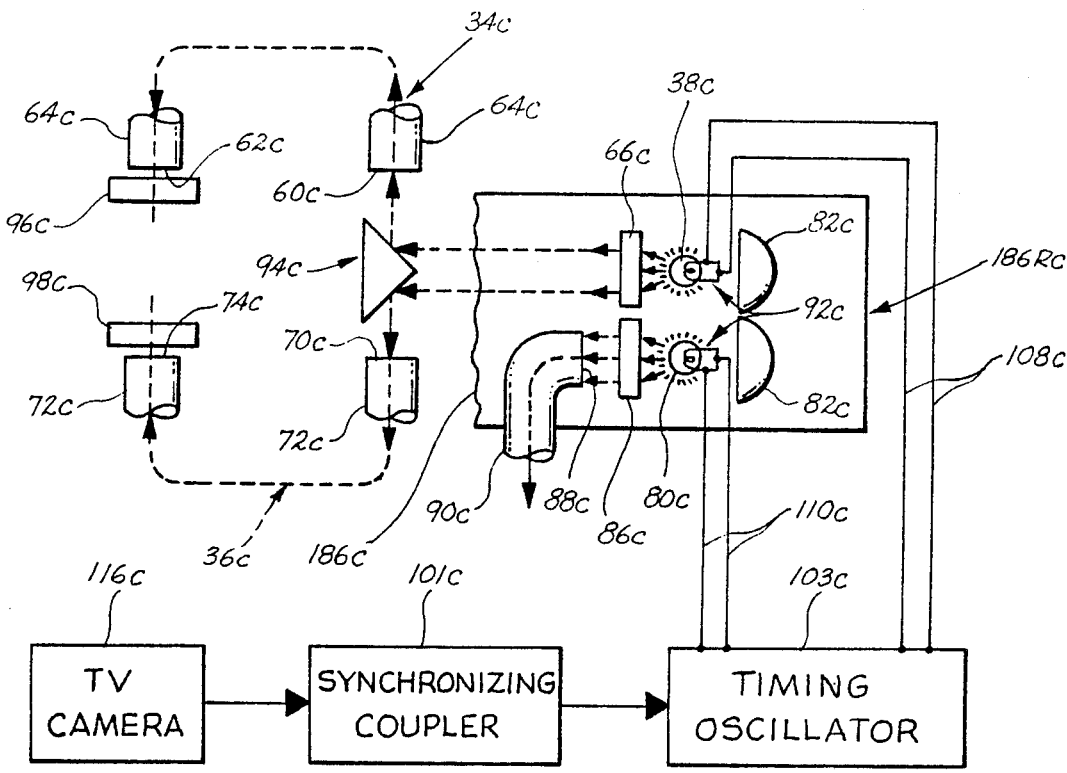
FIG. 1D
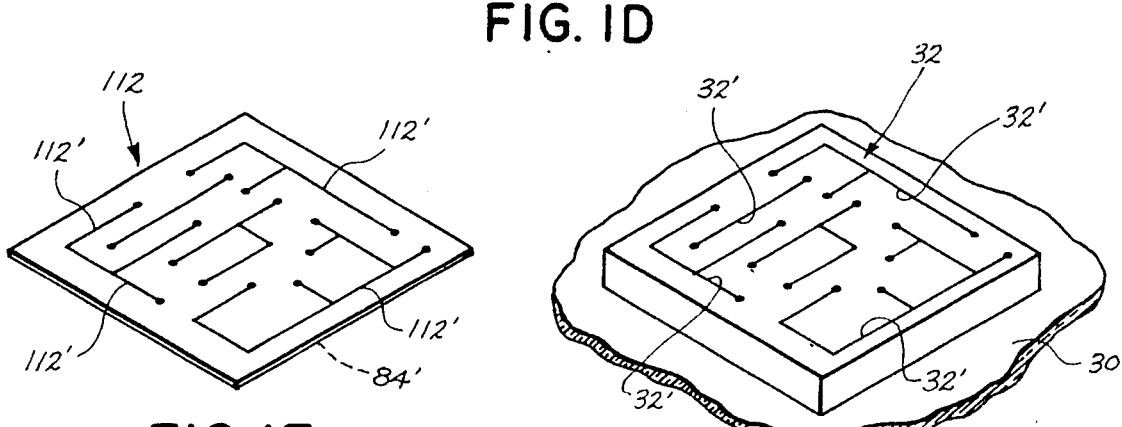
FIG. 1F
FIG. 1E
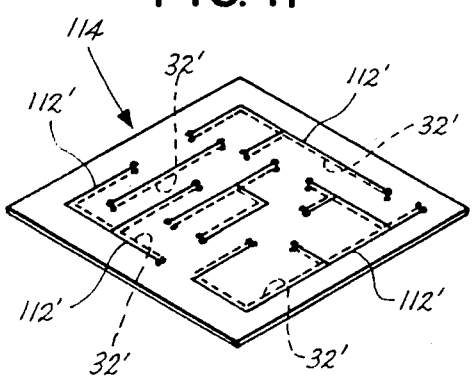
FIG. 1G
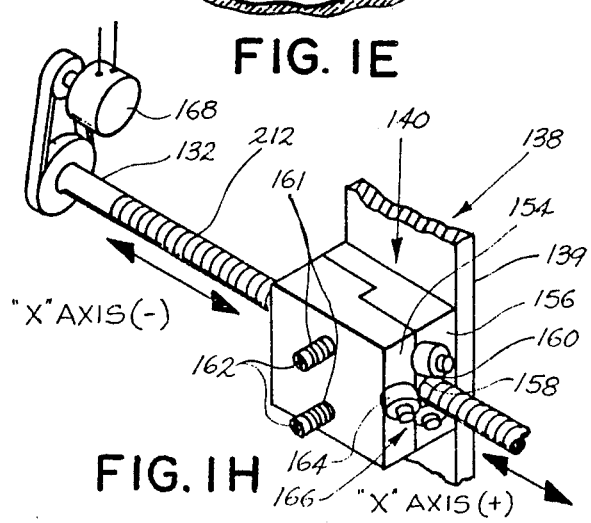
FIG. 1H

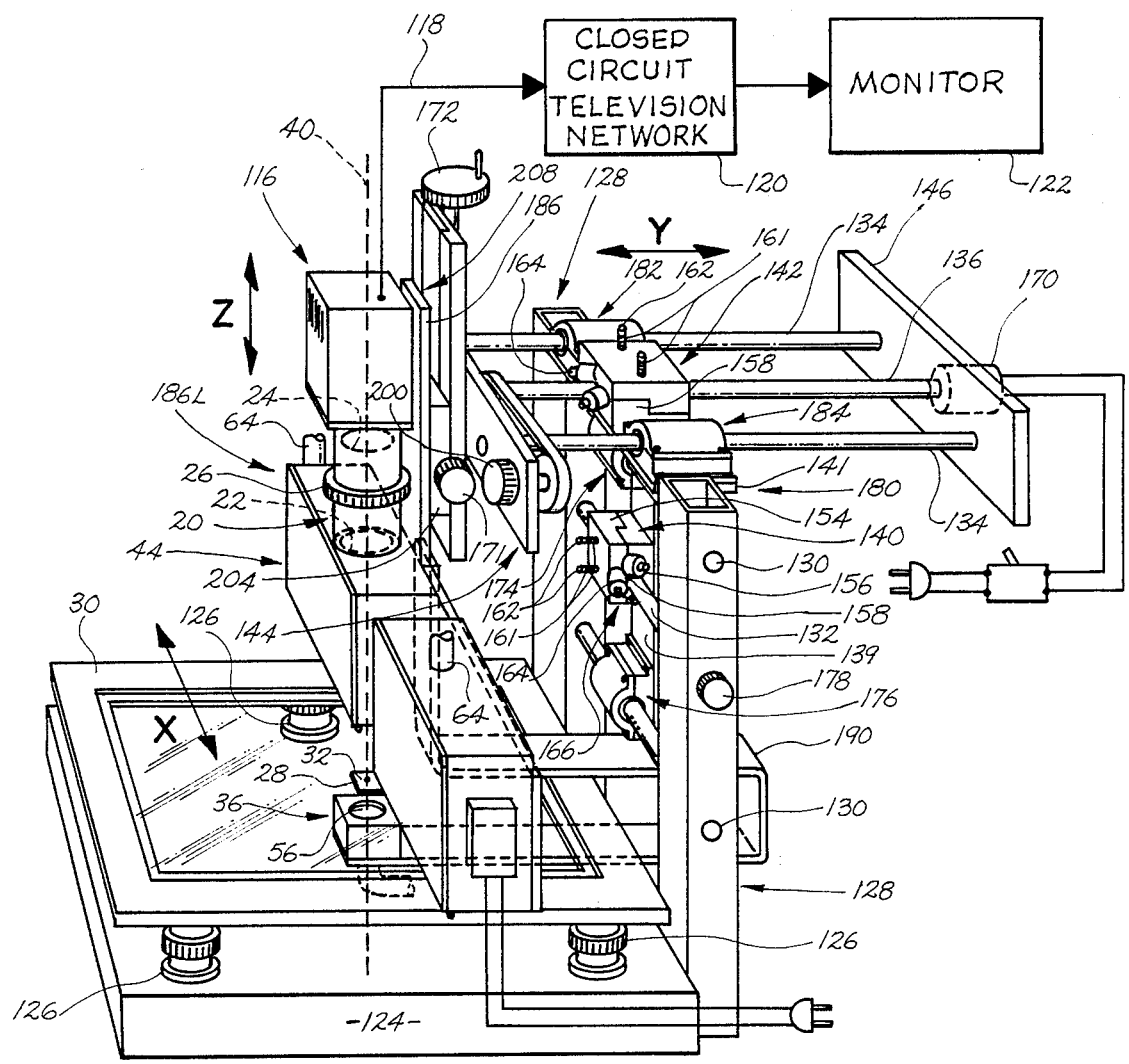
FIG. IJ
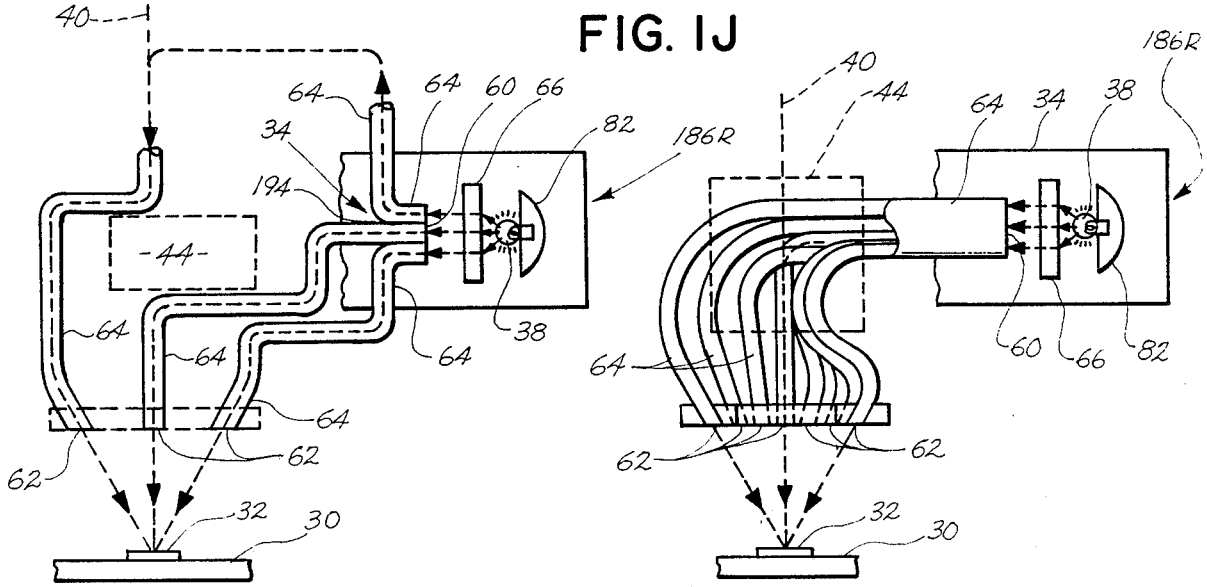
FIG. IK
FIG. IL

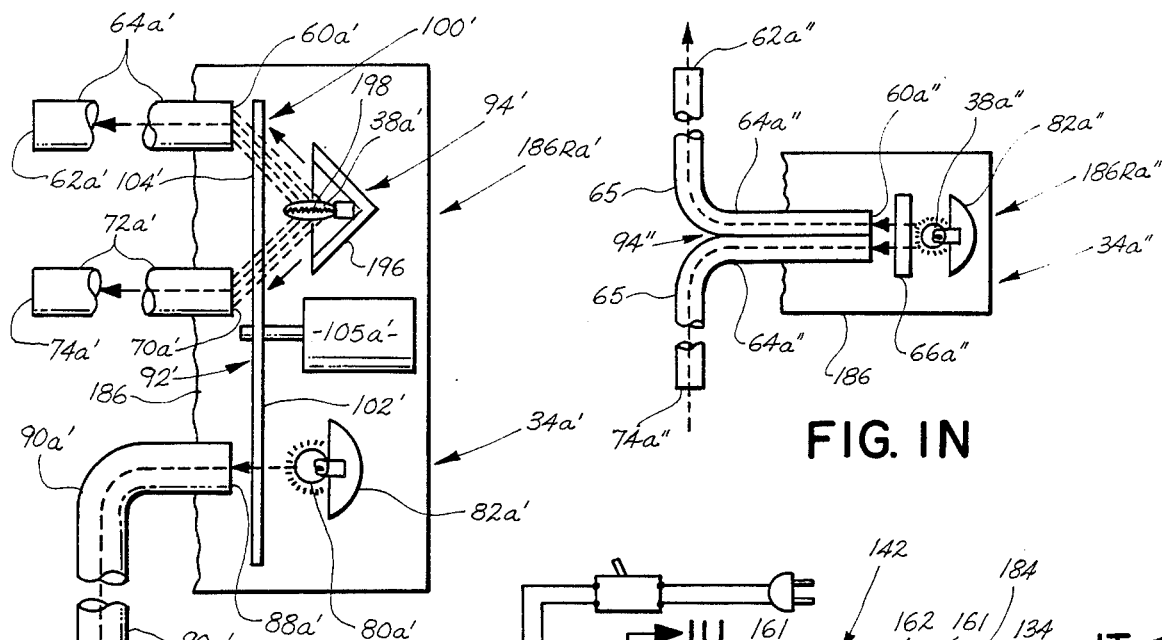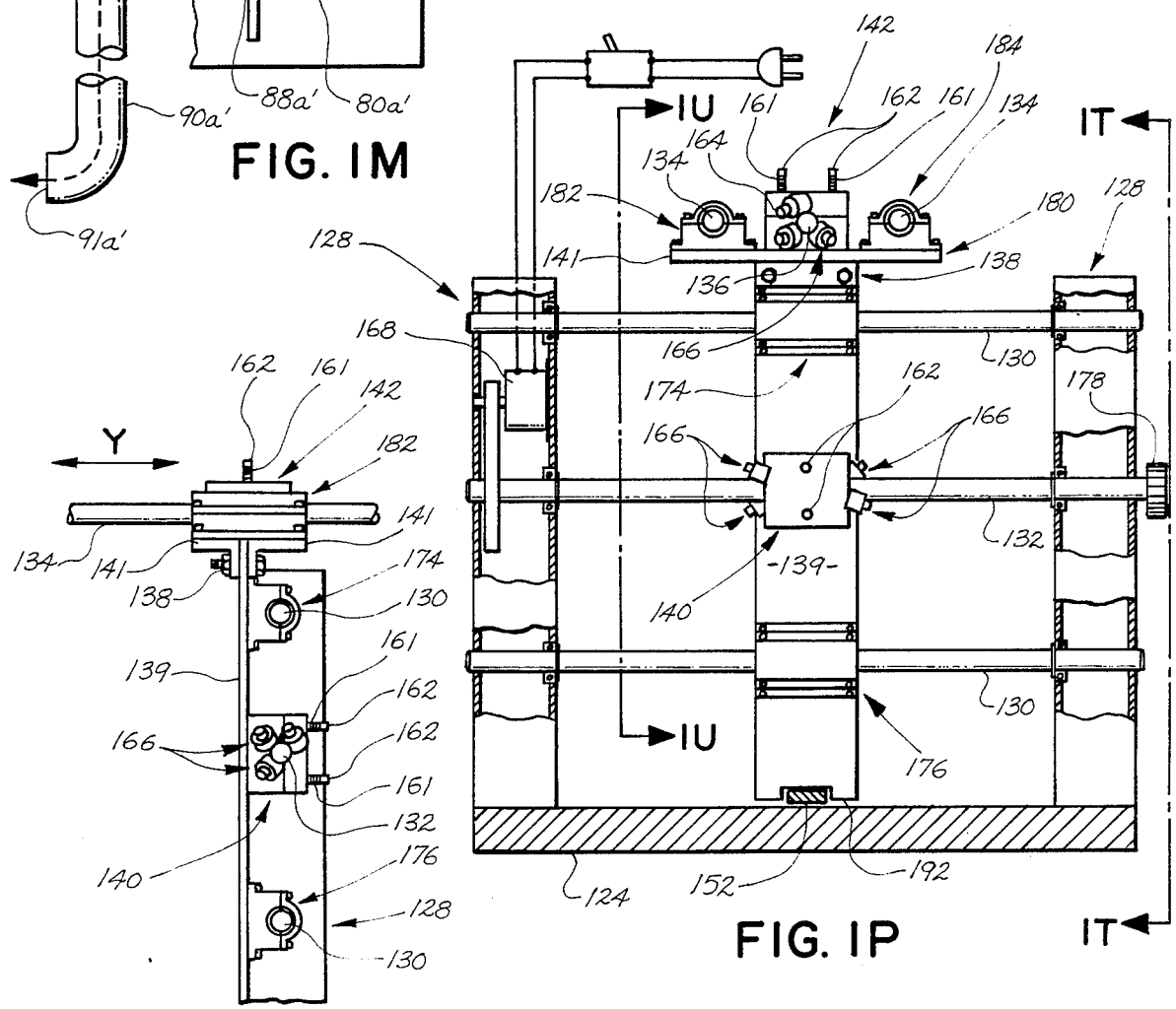

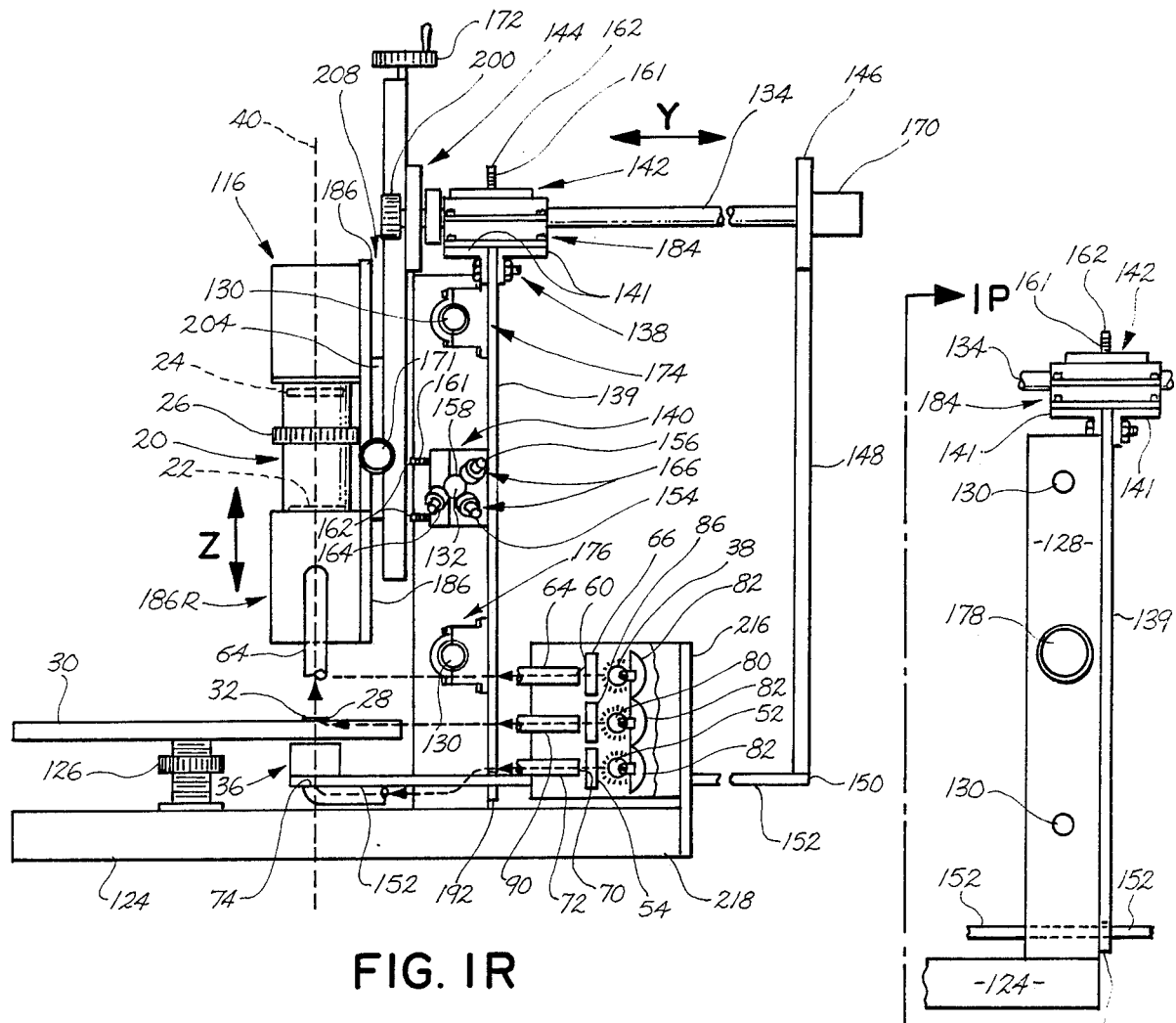
FIG. IR
FIG. IT
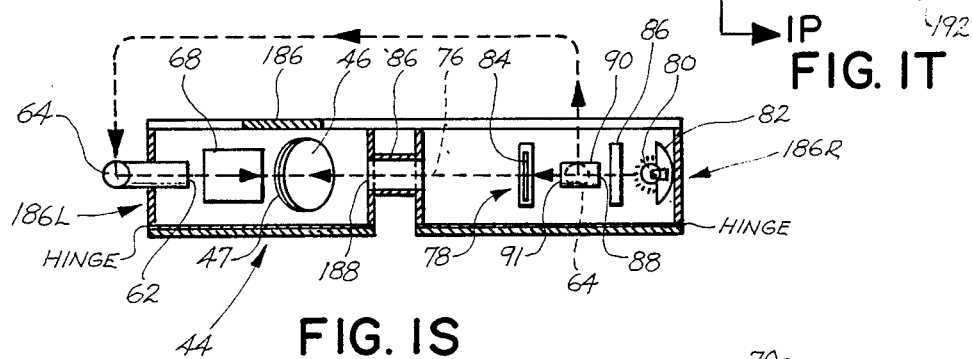
FIG. IS
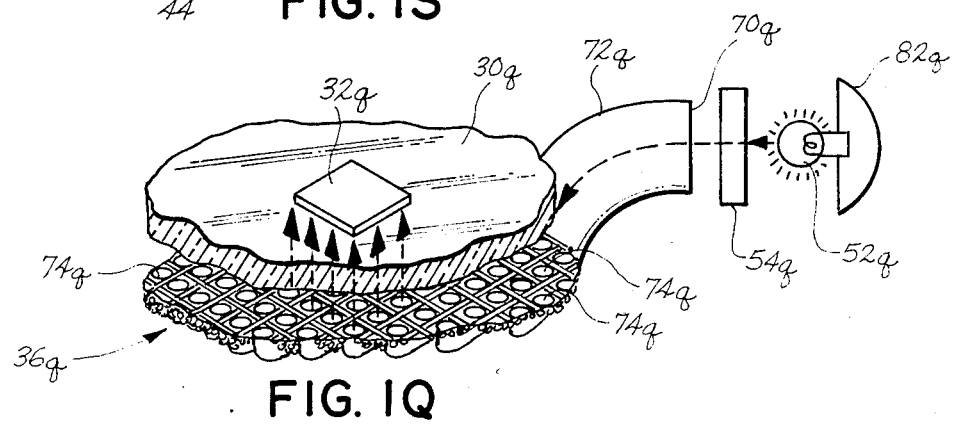
FIG. IQ

MICROSCOPE VIEWING APPARATUS FOR VIEWING A SPECIMEN IMAGE AND AN OPTICAL OVERLAY PATTERN IMAGE IN A COMPARISON MANNER

BACKGROUND OF THE INVENTION

The field of the invention is generally that of microscopic viewing, comparing and/or measuring apparatuses intended for performing any or all of certain viewing, comparing and/or measuring operations relative to any of a variety of different types of miniature specimens, such as miniature circuit boards, components, and combinations of components, and/or miniature circuit boards in the micro-processor, micro-chip or molecular electronics field, although not specifically so limited.

In the past, microscopes for viewing micro components or circuit boards or the like have been provided with arrangements for mounting the specimen on a viewing stage (often, transparent or apertured to provide for bottom or transmitted light illumination) and the viewing stage has been arranged for mounting in a mutually perpendicularly adjustable manner in the viewing plane and where precise measurement was concerned, measuring scales have been provided lying in mutually perpendicular relationship where such is desired to allow measurements to be taken relative to the specimen mounted on the viewing stage and in certain prior art situations, where comparison was desired, a known physical object of known physical dimensions might be placed close to the specimen on the viewing stage and viewed together for allowing visual comparisons to be made. However, this was quite limiting and did not provide the desired flexibility for comparison purposes. Also, in certain prior art systems, the viewed image of the specimen might be received by a television camera and after appropriate enlargement and/or image intensification or contrast enhancement or other desired image modification, might be viewed on a television picture tube by one or more individuals. In such a prior art system, a separate image might be electronically combined with the specimen image, but this has not been precise enough, because of variations in such electronic and television systems. Thus, a composite comparison reference image and the specimen image could not be relatively comparitively measured to any great degree of accuracy in such a prior art system.

It is quite clear that the prior art systems of the type mentioned hereinbefore have major disadvantages, arising primarily from the fact that they provide what might be termed "qualitative" microscopic viewing systems, rather than "quantitative" and highly accurate microscopic viewing systems capable of providing very precise and accurate direct measurements or comparative measurements, and it is clear that any improvement in such microscope viewing, comparing, and/or measurement apparatus which would eliminate the above-mentioned prior art limitations and disadvantages would be highly desirable and this is precisely the type of improved microscopic viewing, comparing, and/or measuring apparatus which is provided by and in the present invention, and which has the advantages mentioned immediately above, together with others implicit in the novel aspects of the present invention, and which virtually completely overcome most presently known prior art problems, disadvantages, and/or limitations, with all of said advantages of the present invention flowing from and occurring by reason of the specific features of the present invention pointed out hereinafter.

SUMMARY OF THE INVENTION

Generally speaking, the present invention comprises an improved and novel form of microscopic viewing apparatus for viewing an effectively microscopically enlarged specimen image of a real microscopic specimen, for also viewing a desired type of pattern image, for arranging for the two images to assume desired relative positional relationships, such as an effective optical overlay relationship in one preferred form, so the two images can be effectively compared and so relative or direct measurements can be very precisely made and, in one preferred form, providing means for causing the two images to be alternately visually present, but not to be present at the same time to avoid any possible optical interference with each other, and with the alternating rate of the presence of the two different images being such as to be capable of being visually viewed and effectively compared. In certain cases, this may be by reason of what may be termed the "persistency of vision" effect, or it may be because of the decay characteristics of the television picture tube phosphor (or equivalent) in systems using a pickup television camera at the microscope viewing apparatus eyepiece and a television picture tube as the output of the system to be viewed by the operator (or operators) of the apparatus.

In one preferred form of the invention, the above-described apparatus and/or means for achieving the above-described modes of operation and the above-described end results, includes a microscope multiple lens means having microscope objective lens means, microscope eyepiece lens means, and selectively relatively movable and relatively adjustable lens-position-adjusting focusing means for focusing on a focusing plane at or above a specimen support panel or stage and coincident with a desired viewing plane of a real microscopic specimen positioned thereon. Said first-mentioned preferred form further includes in one embodiment thereof, microscope illuminating means for illuminating, in any desired manner, such a real microscopic specimen positioned on such a support panel or stage.

Furthermore, one preferred form of the invention includes separate overlay pattern-generating or image-generating means arranged to effectively generate a desired type, shape and size of optical overlay pattern or image intended to effectively visibly observably overlay an effectively microscopically enlarged optical microscopic specimen image of a real microscopic specimen in an effectively predetermined and/or preselected relationship thereto.

Furthermore, said first-mentioned preferred form of the invention includes optical-image-mixing (and optical-image-combining) means arranged to receive at least two different optical image inputs and to effectively mix and combine same into desired, selectively optically alignedly, effectively centered and superimposed relationship to form a resultant effectively composite image output for effective viewing (usually effective optical viewing) by a microscope viewing apparatus (which is usually optically alignedly positioned thereabove) and effectively coupled thereto (usually optically coupled thereto.)

In said first-mentioned preferred form of the invention, a first one of said two different optical image inputs comprises a microscope specimen image input and a second one of said two different optical image inputs comprises a separate optical overlay pattern or image input.

A preferred embodiment of the above-mentioned exemplary form of the invention may also include an effective alternating-image-interrupting (which shall also mean effectively negating or effectively cancelling) optical chopper means effectively positioned upstream in a flow path sense from the optical-image-mixing-and-combining means for timedly alternately interrupting each of the two different optical image inputs (usually in a desired 180° relative phase-displaced relationship) so that the two different image inputs will not co-exist for identical time periods, but will alternately individually exist in the previously-mentioned resultant effectively composite image output of the optical-image-mixing-and-combining means, thus, avoiding any possible image interference and/or image-cancellation effects, in whole or part, of either of such two images.

Furthermore, in the preferred version of the first-mentioned exemplary embodiment of the invention, as referred to in the immediately preceding paragraph, the optical chopper means has a repetition frequency rate of operation such as to cause the effective "persistency of vision" effect to result in the apparent effective viewing of both of the two images when said resultant effectively composite image is viewed by said microscope viewing apparatus.

Furthermore, in one version of the immediately above-described embodiment of the exemplary first-mentioned form of the invention, the microscope viewing apparatus mentioned hereinbefore may include effective television camera apparatus, television-picture-reproducing apparatus and coupling means for effectively coupling same together and with the television camera apparatus including means effectively coupling same to eyepiece lens means of the microscope viewing apparatus.

Additionally, in one form of the version of the apparatus mentioned immediately above and employing television apparatus, said television apparatus may include effective picture-element time-spreading means which functions effectively (as a result of phosphor time constant) to produce the above-mentioned "persistency of vision" effect.

In a preferred version of the above, the television apparatus includes a solid-state television camera apparatus which has the advantage of picture element location fixation or a non-drifting characteristic thereof increasing the accuracy of comparison and measuring functions performed by the apparatus with respect to a real microscopic specimen viewed by the apparatus, although in the form including the optical chopper (effectively self-calibrating), the need for this is reduced.

OBJECTS OF THE INVENTION

With the above points in mind, it is an object of the present invention to provide a novel microscope viewing apparatus capable of viewing a specimen image (usually an enlarged specimen image) of a real specimen and also capable of measuring various portions of the real specimen by way of the enlarged specimen image, and also capable of comparing the specimen image with a separate index or reference pattern or image, and doing so in a manner where the specimen image and the index or reference pattern or image remain in true dimensional relationships to each other, whereby to provide extremely accurate comparisons therebetween and/or relative measurements thereof.

It is a further object of the present invention to provide microscopic viewing apparatus of the character referred to herein wherein the two images referred to hereinbefore and comprising the specimen image and the index or reference image are effectively mixed and combined optically (and, in one non-limiting form, selectively adjusted as to relative image-brightness) prior to being further processed, optically, electronically or otherwise, and also to being viewed as a resultant effectively composite image, so that no aberrations or undesired modifications or changes of either image can occur independently of the other, thus, maintaining a completely correct relationship between the two images at all times, whereby to provide for great accuracy in the resultant composite image to enable very precise measurements or comparisons between the two images to be made.

It is a further object of the invention to provide a microscope viewing apparatus of the character referred to herein wherein the reference or index image (including cross-hairs and/or calibrated micrometer ruler images) takes the form of an overlay pattern or image arranged to be effectively placed in substantially superimposed (or an overlay) position relative to the specimen image (directly thereover or adjacent thereto, as desired) which is to be visibly compared therewith.

It is a further object of the present invention to provide microscope viewing apparatus of the character referred to herein, wherein the specimen image and the index or reference image which are to be visibly compared are rapidly alternated so that neither image interfers with or effectively negates or cancels any part of the other image; inasmuch as they do not coexist for identical and concurrent periods of time, but, instead, rapidly alternate.

It is a further object to provide a novel microscope viewing apparatus of the type referred to hereinbefore, wherein the rate of alternation of the two different images - - that is, the specimen image and the index or reference pattern or image is such as to cause an effective "persistency of vision" effect to result in the apparant effective viewing by an observer of both of the two images when the resultant effectively composite image is being viewed by the observer.

It is a further object of the present invention to provide microscopic viewing apparatus of the character referred to in the immediately-preceding object, wherein the "persistency of vision" effect is either a physiological one caused by the fact that the human eye will see an apparently continuous composite image even when the composite is actually made up of two different image components which are alternately present, as long as the alternating rate is of the order of fifteen interruptions per second, or greater.

It is a further object of the present invention to provide microscopic viewing apparatus of the character referred to in the second preceding object wherein the so-called "persistency of vision" effect results to a substantial degree because of the use of television camera and television-picture reproducing apparatus coupled to the eyepiece lens means of the microscope viewing apparatus and the fact that the phosphors used in the television picture-reproducing tube have what amounts to an effective picture-element time-spreading effect which causes the two alternating images to appear to the eye to have merged into one resultant effectively composite image.

It is a further object of the present invention to provide viewing apparatus of the character referred to in the two immediately-preceding objects wherein the television apparatus includes solid-state television camera means having the advantage of no effective picture-element "drift"- - in other words, each television picture-element is locked into a very precisely located physical position, thus, making very precise measurements of the specimen image possible to a much greater degree than would be possible with conventional television camera apparatus. This is less important in the "chopper" form because of self-calibration.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, several exemplary embodiments of the invention are illustrated in the hereinbelow-described figures of the accompanying drawings and are described in detail hereinafter.

BRIEF DESCRIPTION OF THE DRAWING FIGURES

FIG. 1 is a front-positioned oblique three-dimensional perspective view of one exemplary form of the invention as seen from a vantage point above, and slightly to the left of a true front elevational viewing position of the exemplary apparatus. Furthermore, the apparatus is shown fragmentarily with certain portions removed and/or partially broken away for reasons of drawing simplification and/or clarity.

FIG. 2 is a side-positioned oblique three-dimensional perspective view of the apparatus of FIG. 1, also with certain portions of the complete apparatus removed and/or partially broken away for reasons of drawing simplification and clarity.

FIG. 3 is another oblique three-dimensional view of the apparatus of FIGS. 1 and 2 as seen from a different vantage point substantially higher than the vantage point of FIG. 1 and showing in greater detail the structure of two different sets of mutually perpendicular slide rods facilitating the mounting of the microscopic viewing apparatus for movement in two different mutually perpendicular planes along two different mutually perpendicular axes corresponding to conventional x and y cartesian co-ordinates.

FIG. 1A is a fragmentary partial, somewhat diagrammatic view similar to portions of FIG. 1, but illustrating a slight modification thereof, including chopper means arranged to cause the effective alternation of the specimen image input to the microscope and the pattern or overlay image input to the microscope for the purpose of avoiding any possible optical interference therebetween, while still allowing the two to be effectively visually compared. In this slight modification, one exemplary, but not limiting type of chopper means is employed and is intended to be representative of a variety of other functionally equivalent chopper apparatuses which may be employed in lieu thereof and all of which are intended to be included and comprehended within the broad scope of the invention.

FIG. 1F is a view of the same general type as FIG. 1E, but shows one representative form of overlay pattern or transparency for producing the overlay pattern image which is to be superimposed on the specimen image by the apparatus of the present invention, and it is not to be construed as specifically limiting the overlay transparency or the overlay pattern or image to the particular representative form shown.

FIG. 1G is a fragmentary diagrammatic view showing one representative, but non-limiting, resultant effectively composite image resulting from a specimen image such as produced by the specimen shown in FIG. 1E, and an overlay pattern or image such as produced by the overlay transparency shown in FIG. 1F and it is also representative only, and is not to be construed as specifically limiting the invention to the arrangement shown.

Figure 1:
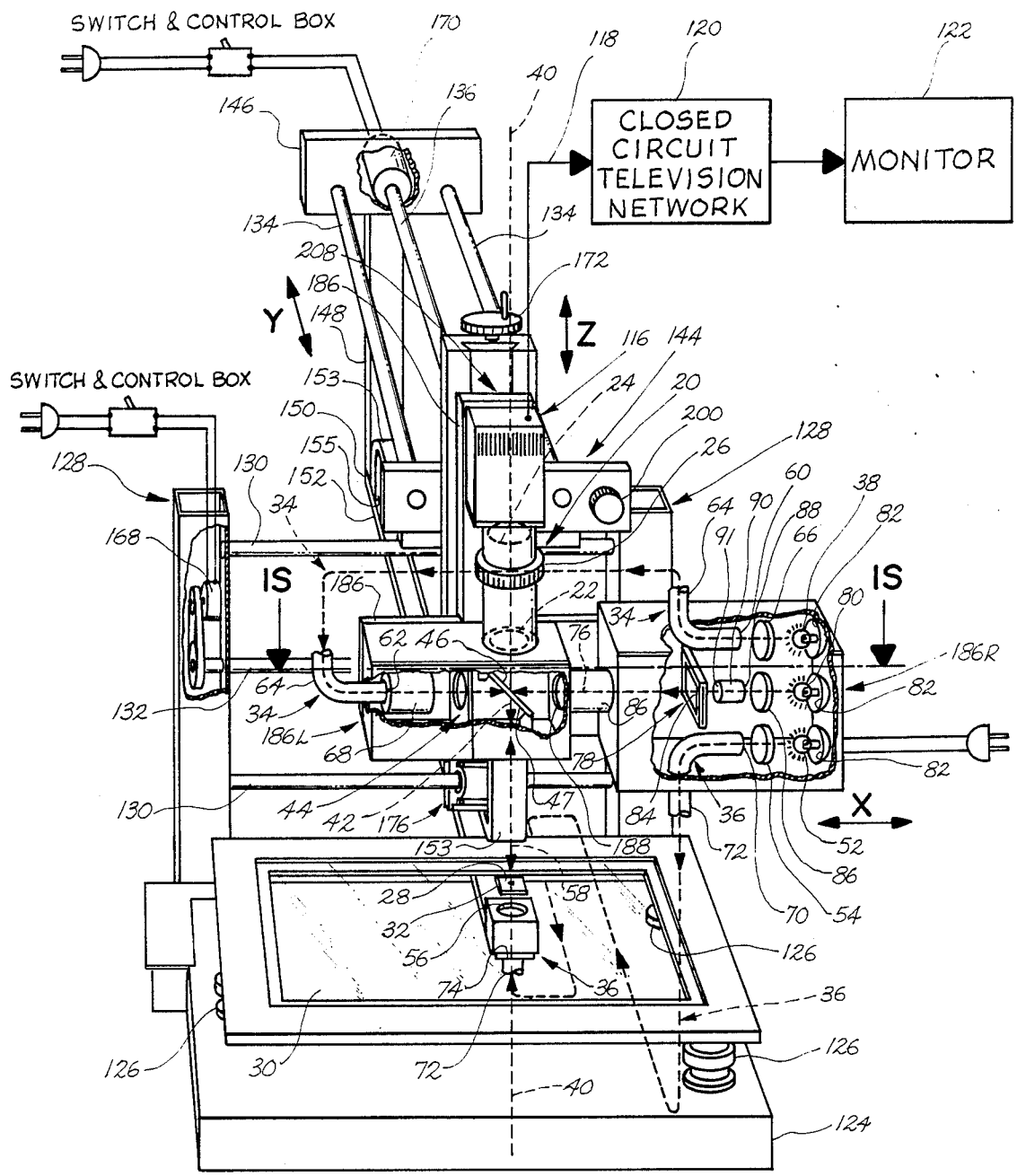
FIG. 1B is a fragmentary, partial, incomplete, and somewhat diagrammatic view of just one shutter part of the chopper means of FIG. 1A taken substantially along a plane and in a direction such as indicated by the arrows 1B—1B of FIG. 1A. This view shows the shutter in one representative one of its two principal different operative positions.
FIG. 1C is another partial somewhat diagrammatic view of a variation of just the shutter means of FIG. 1A and FIG. 1B, and is shown in a partially block-diagrammatic and partially schematic manner illustrating the use of electro-optical shutters in lieu of the mechanical shutter of FIG. 1A and 1B.
FIG. 1D is another view similar to FIG. 1C, and is of a fragmentary diagrammatic and schematic form, partially showing a modified effective chopper means, including flash lamps operating alternately in lieu of the electro-optical shutter means of FIG. 1C operating alternately.
FIG. 1E is a representative view of one particular kind of specimen which might be placed on the specimen platform for viewing by the microscope apparatus and is representative only, and is not to be construed as limiting in any manner whatsoever.
Figure 2:
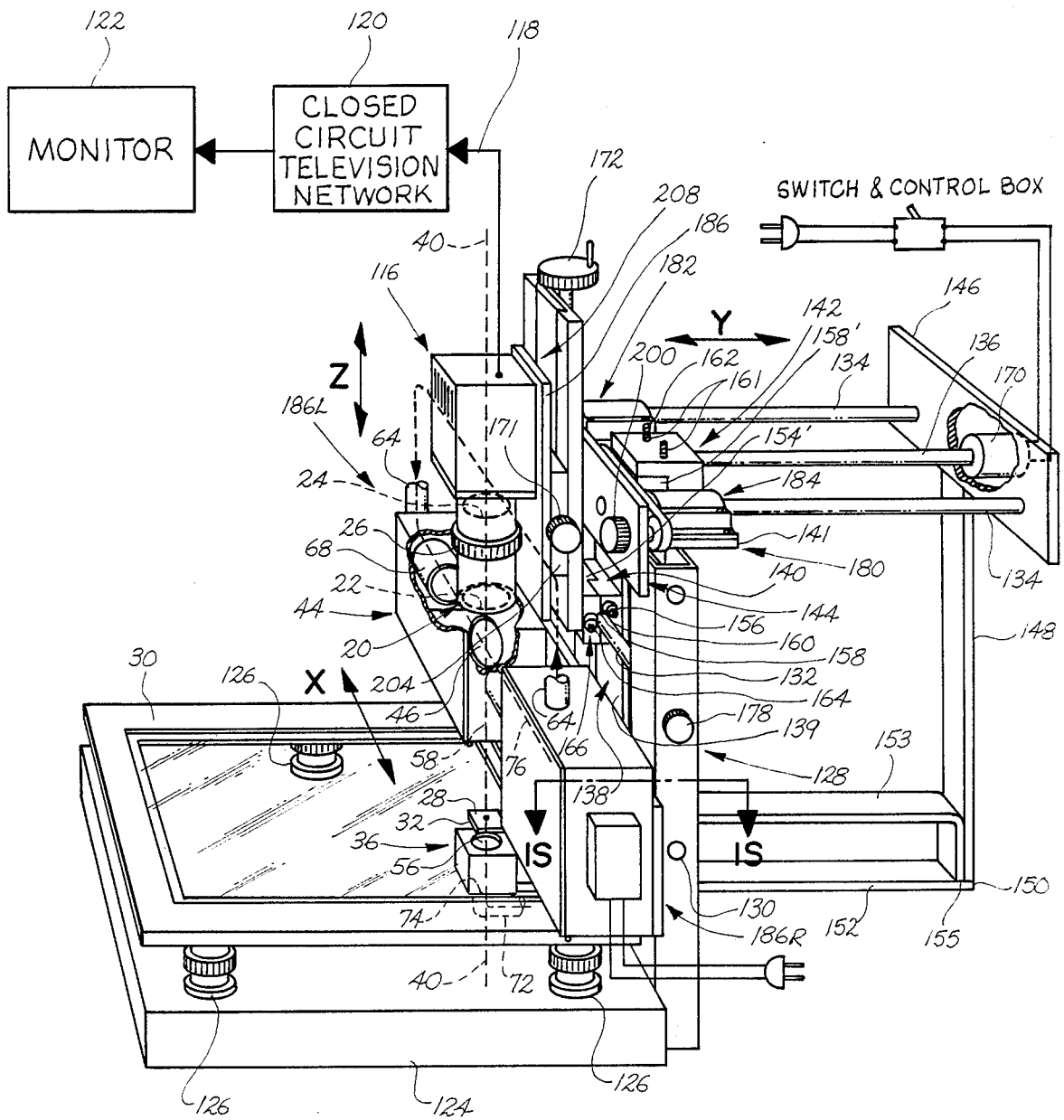
Figure 3:
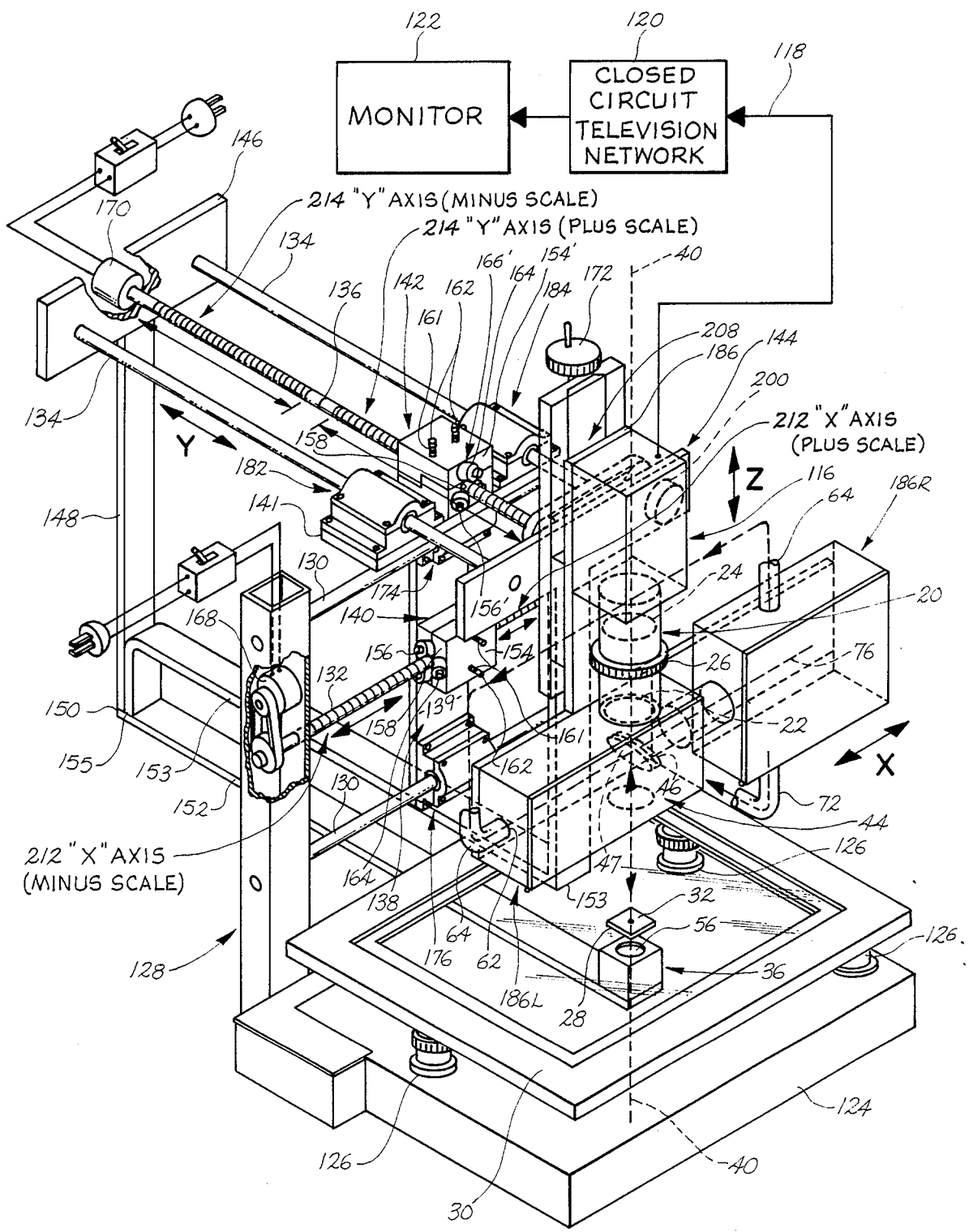

FIG. 1H is a fragmentary, partially broken away, enlarged three-dimensional view of a representative one of the two actuators shown in FIGS. 1, 2, and 3, but drawn to a substantially larger scale. The so-called lateral or x axis actuator is the one selected for this view, but it should be clearly understood that it is also representative of the other y axis actuator shown in FIGS. 1, 2, and 3.

FIG. 1J is a fragmentary view generally similar to the central portion of the first form of the invention shown in FIGS. 1, 2 and 3, but, in this case, it shows the downward extension member which carries the mixer at its lower end in the first form of the invention as additionally having an extra downward extension which is bent and descends behind the support panel to a position below the support panel where it carries the bottom central portion of the bottom illuminator so that the microscope upper portion, the mixer, the pattern or image generator, the top illuminator and the bottom illuminator are all carried for simultaneous movement.

FIG. 1K is another fragmentary view similar to the showing of FIG. 1J, but showing a slight modification thereof with respect to the upper illuminator means which, in this modification, is split into three portions fed by three separated output portions of the fiber optic light pipe from the light source (where all three of the output fiber optic cable portions are assembled together at the input end thereof) and where the three separate output portions are circularly spaced around the optical axis of the microscope and are downwardly and inwardly canted so that the top illuminating light rays are slightly oblique for producing "dark field" top illumination.

FIG. 1L is another fragmentary view very similar to FIG. 1K, but showing a modified output end of the upper or top illuminator means employing a ring-shaped output end, producing a circle of downwardly and inwardly angularly converging light rays for top illumination of the specimen by oblique light and thus, providing a slightly different arrangement for "dark field" top illumination of the specimen.

FIG. 1M is another fragmentary view of the beam splitter portion of FIG. 1A, and illustrating in fragmentary form a slightly modified arrangement of the beam splitter and beam splitting input to the two different fiber optic light pipes communicating with the upper and lower illuminator means, and comprising the use of the characteristic of one type of illuminating lamp which provides two laterally adjacent bright portions separated by an intervening relatively darker portion.

FIG. 1N is another fragmentary view generally similar to FIG. 1M, and shows a slightly varied beam splitter comprising a fiber optic light pipe having a given number of input fiber optic light strands which are separated into two different output sections, each having one half the number of input strands, thus providing an effective beam splitter.

FIG. 1P is a fragmentary view of the first embodiment of the invention similar to a central lower portion view of FIG. 1, but slightly modified to show the downward extension which has a bifurcated bottom end slideably engaging the forwardly directed bottom tie rod connected to the central bottom portion of the bottom illuminator means; in this case, carried by the lower end of the plate carrying the lateral and fore and aft actuator means. This fragmentary view (with many parts removed for drawing simplification and clarity) is taken substantially along the plane and in the direction indicated by the arrows 1P—1P on FIG. 1T.

FIG. 1Q is a fragmentary, partially broken-away, view of the lower portion of the first form of the invention illustrated in FIGS. 1-3 (although it is also applicable to any of the other forms of the invention illustrated and/or described elsewhere herein) and shows a slight variation of the invention wherein the bottom illumination means of the other forms of the invention an the mechanical coupling means connected thereto for moving the bottom illumination means in an x-axis direction and/or in a y-axis direction along with corresponding movement of the entire upper microscope portion, the mixer, and the overlay pattern or image generator) are eliminated and a modified bottom illumination means is substituted therefor and does not require any x-axis movement or any y-axis movement, because it comprises a large-area, flat panel type of effective light-emitting means which emits light upwardly of substantially equal brightness over substantially its entire upper surface area, which is substantially area-coextensive with the entire usable area of the transparent specimen support panel or stage positioned thereabove. In the specific representative, but non-limiting, example illustrated in FIG. 1Q, said light-emitting means is shown as comprising a woven optical-fiber fabric panel (or mat) having an optical-fiber and remote light source (lamp) light input to said mat where the light leaks out because each of the woven optical fibers is bent more than the critical angle which must not be exceeded in any optical fiber which is otherwise functioning as a so-called "light pipe", retaining virtually all of the light inside of the optical fiber. An optional effective mirror may be placed below the mat to prevent the loss of downwardly directed light which may be emitted by the woven optical-fiber mat.

FIG. 1R is another fragmentary, partially broken-away, view of a lower, rear portion of the first form of the invention illustrated in FIGS. 1-3, (and could be as modified in the FIG. 1A and FIG. 1B form of the invention, although, it is also applicable to any of the other forms of the invention illustrated and/or described elsewhere herein) and shows all of the light sources (lamps, etc.) re-positioned from the laterally offset location thereof, as shown in the first forms of the invention illustrated in earlier figures of the drawings and as described hereinbefore, to a centrally symmetrically positioned location - - in the example shown, at a rear location mounted on a common upstanding panel carried by a rear extension of the underlying base supporting the entire apparatus.

FIG. 1S is a fragmentary top sectional view taken in the direction, and along the plane, indicated by the arrows 1S—1S on FIG. 2, and on FIG. 1.

FIG. 1T is a fragmentary view of aspect similar to FIGS. 2, but illustrates the modified main structural form of the invention illustrated in FIG. 1P, as seen in the direction of the arrows 1T—1T in FIG. 1P.

FIG. 1U is a fragmentary sectional view taken in the direction, and along the plane, indicated by the arrows 1U—1U on FIG. 1P.

DESCRIPTION OF THE PREFERRED EMBODIMENTS

Generally speaking, the exemplary first form of the invention illustrated comprises microscopic viewing apparatus for viewing a specimen image (usually a microscopically enlarged specimen image) of a real specimen (usually a real microscopic specimen) positioned on a substantially planar (usually horizontal) intermediate support specimen panel or stage and for comparatively viewing a desired or selected superimposed (usually optically alignedly superimposed) overlay pattern or image in a selected relationship (usually a selected substantially superimposed relationship) relative to the specimen image to which or with which the overlay pattern or image is desired to be compared. In one preferred form, the superimposed relationship of the overlay pattern or image relative to the specimen image is in substantially symetrically centered relationship, although not specifically so limited in all forms of the invention. In the specific example illustrated, the microscope viewing apparatus includes microscope multiple lens means such as is generally designated at 20 in one exemplary, but non-specifically limiting form, with the exemplary microscope multiple lens means 20 being shown for representative purposes only as having microscope objective lens means 22, microscope eyepiece lens means 24, and selectively relatively movable and relatively adjustable lens-position-adjusting focusing means, such as indicated generally at 26 in one representative, but non-specifically limited form, and which is arranged for focusing the microscope multiple lens means 20 on a focusing plane, such as is indicated at 28 in the example illustrated and which is positioned immediately above (in the example shown on the top surface of) a specimen support panel or stage 30, which, in the representative example shown, comprises a transparent panel of transparent material such as transparent plastic sheet material or a transparent glass or quartz support panel (quartz being used instead of glass where ultraviolet transmissibility is desired.) It should be noted that the focusing plane 28 is coincident with a desired viewing plane, also designated by the reference numeral 28, and with said composite plane 28 being also coincident with that plane of a real microscopic specimen, such as that indicated at 32, positioned on the specimen support panel or stage 30.

The microscopic viewing apparatus further includes a microscope illuminating means for illuminating in any desired manner such a real microscope specimen 32 positioned on the specimen support panel or stage and this may comprise illuminating means for providing top illumination of the specimen 32, illumination means for illuminating the specimen 32 from the bottom and illumination means for so-called reflected light viewing of the specimen 32 and/or illuminating means for providing for transmitted light viewing of the specimen 32 and illuminating means for providing for the viewing of the specimen 32 by what is termed "bright-field" illumination and/or "dark field" illumination and all of such different illuminating modes or any portion thereof as desired may be provided by the two top and/or bottom illuminators indicated generally at 34 in the case of one representative top illuminator, and at 36 in the case of one representative bottom illuminator, specific details of which will be amplified hereinafter.

In the case of the top illuminator, the light source 38 for same can be transversely offset from the central optical axis 40 of the microscope multiple lens means indicated generally at 20, the lower illuminator means 36 and the upper illuminator means 34 and the specimen viewing position of the specimen 32 on the specimen support panel or stage 30. The top illuminator means 34 may be of any type adapted to introduce the top illumination into the optical path of the upper microscope portion 20 (usually therebelow) in a manner such that the top illuminating rays 42 will be downwardly directed adjacent to the optical axis 40 of the microscope for direct top surface impingement on the specimen 32 whereby the incident illuminating rays 42 will be reflected back upwardly from the specimen 32 into the open lower end of the upper microscope portion 20 for reception first by the objective lens means 22 and subsequently by the eyepiece lens means 24 in the usual manner of a compound microscope.

In the particular exemplary first form illustrated, said top illuminator means includes light transmission means of the so-called "light pipe" type usually comprising bundles of optical fibers for so-called fiber-optic transmission of light from an input end 60 to an output end 62 of such an optical fiber light transmission means indicated at 64. The arrangement is such that light emitted from the top illuminator lamp 38 enters the input end 60 of the fiber optic light pipe and is transmitted to the output end 62 thereof which is fed into the optical path of upper portion 20 of the microscope therebelow for downward deflection, usually by an angular semi-transparent mirror or the like, through the lower portion of the mixer 44 onto the upper surface of the specimen 32. A condenser 66 may be positioned at the input end 60 of the light pipe 64, or a condenser 68 may be positioned at the output end 62 of the light pipe 64, it being understood that these are alternates, and normally one or the other of the two condensers 66 and 68 would be used and not both at the same time.

In the exemplary first form illustrated, the abovementioned "downward deflection" of the top illuminating rays 42 is accomplished by a downwardly angularly facing light-reflective and light-transmissive partially silvered mirror 47 which, in one preferred form, may be of a type 25% reflective and 75% transmissive, although not specifically so limited. This reflects the top illuminating light rays 42 directly downwardly onto the specimen 32 for reflection back upwardly through said mirror 47 along the optical axis 40 and into the lower end of the upper microscope portion 20.

In addition to the top illuminating light rays 42 being reflected back from the specimen 32 and passing upwardly through the just-mentioned lower angularly downwardly facing partially silvered mirror 47, said reflected light rays will also pass upwardly through the closely-adjacent angularly upwardly facing second mirror 46 which is also partially silvered, and in one form is of a 25% reflective and a 75% transmissive type, and which is part of the later-described mixer 44. Thus, even though the top illuminating light rays have had to pass through both of the oppositely angularly directed mirror 47 and 46 during the reflected return path of said light rays from the specimen 32, the 75% light transmission capability of each of the partially silvered mirrors 47 and 46 will allow a substantial percentage of the original top illuminating light rays magnitude to be received by the open lower end of the upper microscope portion 20.

In a preferred arrangement of the mixer 44 the downward facing surface of the bottom mirror 47 and the upwardly facing surface of the top mirror 46 are not exactly parallel to each other, but are very slightly angularly displaced from each other so as to be very close to being parallel to each other, but departing therefrom by a very small angular displacement - - probably too small to be seen in the figures of the drawing and, thus, no attempt to show this very small relative angular displacement from completely parallel relationship of the lower and upper mirror surfaces 47 and 46 is made in any of the figures of the drawings. The very slight angular displacement of the downward-facing bottom mirror 47 correspondingly requires a very slight displacement of the top illuminator output end 62 and the output rays emitted therefrom, so that after impingement thereof on the surface of the bottom mirror 47, the top illuminating rays will be reflected directly downwardly onto the microscope specimen 32. The slight angular displacement of the upwardly facing top mirror 46 requires a corresponding slight displacement of the output 76 from the pattern or image generator 78 so that after striking the slightly upwardly displaced top mirror 46, the upwardly reflected pattern image will be directly vertically aligned with the optical axis 40 for direct combination with the specimen image also directed upwardly along the optical axis 40 into the bottom end of the upper microscope portion 20. The arrangement just described of the two mirrors 47 and 46 being very slightly angularly relatively displaced from true parallel relationship avoids interference caused by certain of the multiple reflections of the system so that unwanted or spurious light or illumination will be effectively substantially eliminated from the viewed resultant or composite image.

As an alternate to the above-described arrangement, it is possible to provide top illumination (and top illuminator means) of a type disclosed by the present inventor in either of two prior U.S. Patents (Nos. 4,299,490 and 4,595,265) pertaining to microscopes and having top illuminating means fully disclosed therein and the following brief description pertains thereto, and is intended to specifically incorporate herein, by reference, the corresponding disclosure portions of said two prior patents identified hereinbelow. In each of said prior disclosures, the top illuminator means is associated with the microscope portion corresponding to the upper microscope portion 20 of the present invention, and the following two pages of description pertain primarily to said prior patent disclosures as applied to the top illuminator means of the present invention, as follows. The condensed top illuminating light rays 42 emitted from the output end 62 of the light pipe 64 comprise the input to the optical path of the upper microscope portion 20 for downward deflection by mirror means, prism means or the like, onto the top surface of the specimen 32.

The introduction of the top illuminating rays of light 42 into the optical path of the upper microscope portion 20 and the means for downwardly deflecting same onto the top surface of the specimen 32 can be done in any of a number of conventional Ways, and one example of one such prior arrangement for introducing the top illuminating rays of light 42 into the upper microscope portion 20 is that apparatus and mode of operation previously disclosed in the prior patent of the present inventor U.S. Pat. No. 4,299,440, which issued on Nov. 10, 1981 and which shows a top illuminator apparatus indicated generally at 156 in FIG. 3 of said prior patent, and wherein the lamp 154 of said prior patent's top illuminator means 156 corresponds to the output 62 of the light pipe 64 of the present invention so that light would then be directed through condenser lens means similar to that shown at 168 in said prior patent, and through the coupling portion indicated at 180 where it is angular-mirror-downwardly deflected for passage by (or past) the objective lens means 134 as shown in FIG. 2 of said prior patent. Therefore, said figures and the corresponding portions of the written description thereof of said prior patent, are, in effect, incorporated herein as a part of this present disclosure as fully as if again repeated in this present application. It should suffice to say that said prior patent clearly illustrates and describes the introduction of top illuminating light rays into the top end of the upper microscope portion of said prior patent, similar to the upper microscope portion shown at 20 in FIG. 1 of the present application and does so in a manner fully disclosing one representative structure for, and one representative mode of operation of, such apparatus for producing downwardly directed top illuminating light rays adjacent to the vertical central optical axis 40 of the upper microscope portion 20 shown in FIG. 1, for example.

It is also possible to introduce the top illuminating bundle of light rays, such as those indicated at 42 in FIG. 1 for example, into a downwardly directed relationship adjacent to the vertical optical axis 40 of the microscope of FIG. 1 in a manner similar to that shown in FIGS. 21, 22, 23, and 24 of prior U.S. Pat. No. 4,595,265 of the present inventor, which issued on the 17th day of June, 1986, wherein the top illuminating light rays would be similarly annularly arranged around the central optical axis (such as that shown at 40 in FIG. 1) of the apparatus and would be, in the apparatus of the present invention, positioned within (or, in certain cases, immediately exterior of) the hollow upper microscope portion 20 shown in FIG. 1 so that an annular bundle of light rays would be centered around the vertical optical axis 40 and would be downwardly directed onto the top surface of the specimen 32 for top specimen surface illumination thereof.

The previously-mentioned bottom illuminator, indicated generally at 36 may also comprise a lamp 52, usually having a reflector 82 immediately therebehind (although not specifically so limited) and adapted to direct light rays into an input end 70 of another fiber optic type of "light pipe" 72 which has its output end 74 directed into the interior of the condenser 56 of the lower illuminator means 36 in an upwardly aimed direction substantially adjacent to (and usually substantially centered on) the vertical optical axis 40 of the microscope and so arranged and positioned as to direct light rays upwardly through a condensing lens 56 which will effectively direct a concentrated group of closely-adjacent bottom illuminating light rays, indicated at 58 upwardly through the transparent support panel or stage 30, so as to strike the bottom surface of the specimen 32 and to then pass partially through the specimen (and around all peripheral edges of the specimen) and upwardly through the mixer indicated generally at 44, (which will be described in detail hereinafter) and, in so doing, pass upwardly through both of the partially light transmissive mirror means 47 and 46 and into the open lower end of the microscope multiple lens means 20 for reception and optical handling of the received bottom illumination light rays and the specimen image defined thereby by the objective lens means 22 and thereafter by the eyepiece lens means 24 in the customary manner of a compound microscope.

In the above-described mode of operation, it can be seen that the specimen 32 is viewed by transmitted light, while in the previously-described mode of viewing when the top illuminator 34 is used, the specimen 32 can be said to be viewed by top illumination or reflected illumination.

In any case, either so-called "bright-field" illumination or so-called "dark-field" illumination may be employed by arranging the incident light from the illumination means to either be directly normal to the surface of the specimen 32, or to be slightly angularly inclined relative to the surface of the specimen 32 in a manner not truly normal to the surface of the specimen 32, so that incident light is not reflected in a truly normal manner relative to the specimen 32 (as is substantially true of "bright-field" illumination), but because the incident light is slightly angularly inclined, or is non-normal, relative to the surface of the specimen 32, the light reflected therefrom is also slightly angularly inclined relative to the optical axis 40 and this produces the so-called "dark-field" illumination.

It should suffice to say that any of the several different apparatuses and ways of introducing the top illuminating light rays into the upper microscope portion 20 for downward direction onto the top surface of the specimen 32 may be employed. The same is true of the bottom illumination means 36 and in certain forms of the invention, the bottom illuminator lamp 52 and the reflector 82 therefor may be positioned within the portion of the bottom illuminator means 36 centered on the optical axis 40, rather than being offset therefrom and fed thereinto through the light pipe 72. However, the apparatus shown in FIG. 1 shows one exemplary arrangement wherein the bottom illuminator means 36 employs the bottom light pipe 72 and the top illuminator means 34 employs the top light pipe 64. This arrangement is only one of many equivalent arrangements which may be employed for the two illuminator means, but it is an advantageous one when the later-described effective alternating-image-negating or alternating-image-cancelling chopper means is to be employed, as will be described later on.

The previously-mentioned mixer, indicated generally at 44, may be said to comprise an optical-image-mixing and combining means where the previously-mentioned partially light transmissive mirror means 46 (which also may comprise a prism and optical material having different light transmission characteristics in different directions) is usually arranged at an appropriate angle such as a 45° angle or slightly displaced therefrom (see pages 15A and 15B) although not specifically so limited in all forms of the invention, so as to be positioned to receive a laterally directed overlay or pattern image group of light rays 76 and which define a desired type of separate overlay pattern or image in said pattern or image light rays 76 and which are intended to be effectively combined and/or mixed by the mixer 44 so that the specimen image of the specimen 32 will be effectively overlaid by the desired pattern image defined by the pattern image light rays 76 for effective composite viewing at the eyepiece lens means 24 of the upper microscope portion 20.

In the exemplary arrangement illustrated in the first form of the invention, the overlay pattern or image defined by the overlay pattern or image bundle of light rays 76 is produced by what might be termed overlay pattern or image-generating means indicated generally at 78 and comprises a light source or lamp 80 and in some cases, a reflector 82 directing light rays onto the input end 88 of another light pipe 90 which extends toward and optically communicates with a near side of the mixer 44 after having passed through a pattern or image transparency 84 and in some cases, appropriate lens means 86, so that the pattern image will be directed onto the partially reflective mirror 46 which will redirect the pattern or image upwardly in the desired relationship to the specimen image which is also similarly directed upwardly.

The operation of the mixer means 44 in the case of top illumination, is essentially as follows: The top illuminator means 34 directs top illuminating light downwardly onto the top surface of the specimen 32 which is then reflected directly back upwardly from the top surface of the specimen 32 into the bottom end of the upper microscope portion 20. Said reflected back (up) top illuminating rays reflected from the top surface of the specimen 32 into the mixer 44 can be said to comprise an optical input to the mixer 44 and in said case, comprising a specimen optical image input to the mixer 44. The transverse bundle of light rays 76 originating from the separate overlay pattern or image generating means indicated generally at 78 passes through the pattern or image transparency or screen 84 which modifies the pattern or image bundle of light rays 76 so as to define the selected overlay pattern or image therein whereby to cause said image-defining bundle of light rays 76 to comprise a second optical image input to the mixer 44 and in this case, comprising the desired overlay pattern optical image input to the mixer 44 which enters the side thereof and impinges on the angularly inclined partially reflective and partially light transmissive mirror 46 which redirects the overlay pattern or image-defining bundle of light rays upwardly in an effectively combine and superimposed relationship relative to the previously-mentioned upwardly directed specimen image defining bundle of light rays which passes upwardly from the top surface of the specimen 32 through the partially light transmissive mirrors 46 and 47 and on upwardly into the open lower end of the upper microscope portion 20. Since the two different bundles of light rays comprising those defining the specimen image and those defining the pattern or overlay image are in effectively combined relationship immediately above the mixer 44 and remain so as they are received by the open lower end of the upper microscope portion 20, it can be said that the two combined image defining bundles of light rays comprising the two different optical image inputs produce what might be called a resultant effectively composite image output from the mixer 44 cooperating with the upper microscope portion 20 for direct viewing thereby. Of course, it will be understood that relative movement of the entire microscope relative to the specimen 32 on the support panel or stage 30 in either an x or a y direction (considered as part of a conventional cartesian coordinate frame of reference) which will cause the two images - - that is, the specimen image and the overlay pattern image - - to be relatively shifted with respect to each other into any desired relationship. Means for achieving such relative movement will be described hereinafter. Of course, it should also be understood that the pattern or image transparency or screen 84 may be arranged to be shifted in two different mutually perpendicular directions for changing the position of the overlay pattern or image relative to the non-shifted specimen image, if desired. Incidentally, in connection with the foregoing description of the operation of the mixer 44, when the microscope specimen 32 is being viewed by top illumination, the light reflected upwardly from the top surface of the specimen 32 will pass upwardly through the mirrors 47 and 46 into the open lower end of the upper microscope portion 20 because each of the mirrors 47 and 46 is of a partially light transmissive and partially light reflective type. Prisms, Argus glass, partially-silvered mirrors or other equivalents may be used in lieu of the specific mirrors 47 and 46 just described.

When the bottom illuminator means 36 is to be employed, and the specimen 32 is to be illuminated by transmitted light from the bottom illuminator means 36, that process will produce an optical input to the mixer 44 defining the specimen image therein which will pass upwardly through the partially light transmissive mirrors 47 and 46 of the mixer 44 and will thereby effectively combine the two optical image inputs into the previously-mentioned resultant effectively composite image output from the mixer 44 directed upwardly into the open lower end of the upper microscope portion 20 in a manner similar to that previously described in connection with the production of the resultant composite image when the top illuminator means 34 is employed instead of the bottom illuminator means 36.

The foregoing description essentially describes the apparatus in a basic mode of operation where the mixer 44 effectively combines a desired pattern or overlay image with a desired specimen image irrespective of whether or not the specimen image is produced by top illumination or bottom illumination and irrespective of whether or not the specimen illumination is of the so-called "bright-field" type, or the so-called "darkfield" illumination type.

However, in certain preferred forms of the invention, a further optical image input modifying means is employed for the purpose of causing the specimen image and the pattern or overlay image to be effectively alternately present so as to avoid direct optical interference with each other, but so as to be capable of being visually compared because of the rapidity of the alternation of the two different image inputs to the upper microscope portion 20.

Such a modification is illustrated fragmentarily in FIG. 1A and corresponding parts are indicated by similar reference numerals by the letter "a", however. New parts are indicated by new reference numerals. In the FIG. 1A modification, it will be noted that the top and bottom illuminator means 34a and 36a are effectively arranged to be illuminated from a single light source comprising the lamp 38a so that when the chopper means indicated generally at 92, and which will be described in detail hereinafter operates, it will alternately feed light to both the top illuminator means 34a and the bottom illuminator means 36a at the same interrupted alternating rate, while said chopper means 92 will simultaneously chop or interrupt the light fed from the pattern or image generator lamp 80a which will be interrupted in a manner 180° out of phase with the interruption of both the top illuminator light rays and the bottom illuminator light rays.

In the exemplary, but non-specifically limiting form of the invention illustrated fragmentarily in FIG. 1A, the above simultaneous illumination of both the top and bottom illuminator means 34a and 36a from a common source lamp 38a is accomplished by feeding the light from the lamp 38a into a beam splitter 94 which directs half of the light from the lamp 38a into the input 60a of the fiber optic light pipe 64a of the top illuminator means 34a and also simultaneously directs the other half of the input light from the source lamp 38a in the opposite direction into the input end 70a of the fiber optic light pipe 72a of the bottom illuminator means 36a. Thus, whenever the source lamp 38a is energized, the output end of both the upper light pipe 64a and the bottom light pipe 72a is provided with illuminating light rays for use in either top illumination of the specimen 32 of FIG. 1 or bottom illumination of the specimen 32 of FIG. 1 as is desired. Since both the top light pipe 64a and the bottom light pipe 72a will be illuminated at the same time, selective control of which one is actually selected for use in the illumination of the specimen 32 of FIG. 1 can be controlled by operation of a corresponding top shutter or iris 96 or bottom shutter or iris 98 to allow either the top illuminating light to enter the upper microscope portion optical path and be directed downwardly onto the top surface of the specimen 32 of FIG. 1 or to allow the top illumination light to be shut off by closure of the top iris or shutter 96 while opening the bottom iris or shutter 98 which will allow the bottom illuminating light rays to be fed into the portion of the bottom illuminator means 36a lying directly below the specimen 32 of FIG. 1.

The light rays from the composite top and bottom illuminator lamp source 38a is caused to be alternately chopped, interrupted, cancelled or effectively negated at a desired repetition rate while the input from the pattern or overlay image generator lamp 80a is caused to be chopped, interrupted, cancelled or effectively negated at the same rate but in a 180° out-of-phase relationship by the positioning of one exemplary form of the chopper 92 between the light source 38a and its transmission input and the light source 80a and its transmission input and this may comprise a mechanical rotating effective alternating shutter as indicated at 100 or any other functional equivalent thereof. The mechanical rotating shutter 100, as shown in FIG. 1B may comprise a disc, half of which is opaque, and half of which is light-transmissive and which is driven by a timing motor and gearing at a desired interruption rate, in one specific example, of the order of fifteen interruptions or alterations per second, although not specifically limited. An optional coupling line 101 is shown coupled between the television camera 116 and a free-running oscillator circuit 103 powering the motor 105 of the shutter 100 for synchronization purposes, if desired.

As can be seen in the fragmentary view comprising FIG. 1B, when the opaque portion 102 of the rotating shutter 100 is positioned between the composite top and bottom illuminator light source 38a, and the input to the beam splitter of the light-transmission means thereof, no light will pass into the input end 60a of the top illuminator means 34a or into the input end 70a of the light pipe 72a of the bottom illuminator means 36a, while at the same time, light will pass from the overlay pattern or image generator means light source 80a through the light-transmissive portion 104 of the rotating shutter 100 into the input end 88a of the light pipe 90a so the pattern or image will be produced in the mixer 44a and will be reflected upwardly by the mirror 46a. Immediately thereafter, when the rotating shutter 100 has rotated half a revolution, the situation will be reversed and no image or pattern-defining bundles of light rays will be transmitted to the mixer 44 of FIG. 1, but both the top illuminator means 34a and the bottom illuminator means 36a will be transmitting light to the output ends of the upper light pipe 64a and the bottom light pipe 72a where either the upper iris or shutter 96 or the bottom iris or shutter 98 will determine whether top illuminating light rays will be directed downwardly onto the surface 32 of FIG. 1, or bottom illuminating light rays will be directed upwardly through the specimen 32 of FIG. 1. Either such selected top illumination or selected bottom illumination will occur during the period of time when the pattern or image illumination is temporarily non-existent and this situation will alternate rapidly, in one form of the invention at about fifteen cycles per second, although not specifically so limited, so that either a mechanical or physiological "persistency of vision" effect will result in the effective combining of both image inputs so as to produce a resultant effectively composite image output received and viewed by the upper microscope portion 20.

Of course, it should be understood that the particular mechanically rotating shutter form of the effective alternating-image-producing chopper means indicated generally at 92 is exemplary only of the many different forms which said chopper means 92 can take within the broad scope of the present invention. For example, an electro-optical shutter arrangement such as is shown fragmentarily in FIG. 1C may be employed in lieu of the mechanical shutter means 92 of FIG. 1A. In this slightly modified arrangement, the parts corresponding to earlier illustrated and described parts are designated by similar reference numerals followed by the letter "b", however. New parts will be designated by new numbers.

As shown in FIG. 1C, the chopper 92b is no longer a mechanical shutter as best shown at 100 in FIG. 1B, but comprises a pair of 180° out of phase electro-optical shutters 100b each of which is controlled by an input circuit such as indicated at 108 and 110 respectively, and which apply shutter opening and closing potential to each of the two electro-optical shutters 100b in out of phase alternating relationship to each other so when one is effectively optically open, the other is effectively closed and vice versa. In this slight modification, each of the electro-optical shutters 100b is positioned in a complete apparatus of the FIG. 1 type in the manner of the mechanical shutter 100 and the two different shutter portions 102 and 104 thereof relative to the rest of the apparatus.

Means is provided for applying alternating potential to each of the two circuits 108 and 110 controlling the two different electro-optical shutter portions 100b so they will alternate at a desired rate, such as fifteen cycles per second, for example, although not specifically so limited. The alternating potentials applied to the two input electro-optical shutter-controlling circuits 108 and 110 may be provided in any desired manner, such as from an oscillator of any desired type, which may be of a fixed output frequency, or which may be provided with adjusting means for adjusting the output frequency of such a control oscillator, and, consequently, the repetition and alternation frequency of the opening and closing of the two electro-optical shutter portions 100b. If desired, a simple multi-vibrator may be employed for this purpose, or any other functionally equivalent means may be employed for controlling the frequency of alternate opening and closing of the two shutter portions 100b. Also, a coupling line 101b connecting free-runnings oscillator 103b to a t.v. camera 116b may be employed for synchronization purposes.

The electro-optical shutter portions 100b may be of any electrically operated type which effectively controls the transmission of light through the corresponding one of each of the two shutter portions 100b. For example, there are polarization type shutters where the application of potential effectively changes two different polarized portions of the shutter so they are effectively re-positioned in a manner which shuts off the transmission of light through the composite and which upon reversal of the applied controlling electrical signal (or the removal thereof) again re-positions the relatively displaced polarization sections of the shutter into a light transmissive relationship. There are also various other electro-optical shutters functionally equivalent insofar as the alternating of the characteristics of opacity or light transmissibility are concerned, and any such may be employed in lieu of the specific arrangement just referred to.

Otherwise, this slight modification operates essentially similarly to the arrangement illustrated in FIG. 1A and it is believed that further detailed description thereof would be redundant in the light of the foregoing detailed description of the operation of the FIG. 1A version of the invention.

FIG. 1D illustrates a further slight variation of the chopper means which, in this case, is generally designated by the reference numeral 92c and indicates a slight modification wherein the corresponding parts are designated by the same reference numerals followed by the letter "c", however, and wherein new parts are designated by new reference numerals. In the FIG. 1D slight variation, the chopper means 92c actually comprises a light source arrangement wherein the lamp 38c comprises the equivalent of both the top and bottom illuminator, 34 and 36 light sources as shown in FIG. 1 and the lamp 80c comprises the equivalent of the pattern or image lamp 80 as shown in FIG. 1 and said two lamps 38c and 80c take the form of flash lamps which are adapted to be intermittently illuminated and non-illuminated in accordance with the receipt of corresponding electric current or potential of a desired frequency and which may be pulses, sine waves or any other repetitive wave form of a desired light-flashing frequency and with said light flashing electrical input signals being effectively two in number (which shall include the meaning of 180° out of phase portions of the same signal) applied to the two different flash lamps 38c and 80c respectively by two different input circuits 108c and 110c respectively. The arrangement is such that when the two input circuits 108c and 110c apply alternating light-flashing electrical wave forms to the two corresponding flash lamps 38c and 80c, respectively, they will alternately flash at the desired repetition rate, such as fifteen cycles per second as previously mentioned, although not specifically so limited in all forms of the invention.

Any type of circuitry for providing the alternating flash-producing input signals to the two input circuits 108c and 110c may be employed, such as virtually any conventional oscillator, multi-vibrator, or the like, or any functional equivalent thereof. Such a controlling oscillator, multi-vibrator or the like can provide two opposite output signals of a selected fixed frequency or can be provided with adjusting means for selectively adjusting the repetition and alternating rate of operation of the two different flash lamps 38c and 80c. The flash lamps themselves may be xenon flash lamps, or any other substantially functionally equivalent flash lamps, and stroboscopic lamps (arranged in out of phase relationship) may be employed in certain forms of the invention. Also, a coupling line 101c connecting free-running oscillator 103c to a t.v. camera 116c may be employed for synchronization purposes.

FIG. 1E shows a representative specimen 32 alone such as that shown in the first form of the invention as illustrated in FIGS. 1 and 2 and it should be understood that the specimen 32 is representative only of the many possible forms which such a specimen might take, and is not to be construed as limiting in any manner whatsoever.

FIG. 1F is a representative view of an original overlay pattern 112 carried by the overlay transparency 84 shown in FIG. 1 and adapted to produce the overlay pattern or image as previously described, and is not to be construed as limiting in any manner whatsoever.

FIG. 1G is a fragmentary diagrammatic view showing the resultant effectively composite image comprising a combination of the specimen image (indicated in dotted lines at 32') taken from the specimen 32 of FIG. 1E and FIG. 1, and the overlay pattern or image 112 of FIG. 1F (slightly larger than, and offset from specimen image 32') as effectively combined by the mixer shown at 44 in FIG. 1. Said resultant composite image comprising the specimen image and the overlay image is generally designated by the reference numeral 114 in FIG. 1G and is the image present in the dual optical outputs of the mixer 44 of FIG. 1 immediately above the mirrors 47 and 46 thereof, and comprises the so-called two different optical image inputs fed into the open bottom of the upper microscope portion 20 for optical processing and handling thereby in the usual manner of a compound microscope, as previously described.

Of course, it should be understood that both the specimen image and the overlay pattern image (which usually is very slightly larger than the specimen image) combined in the resultant image 114 as shown in FIG.

1G can be modified within wide limits, as may be the desired relative overlay relationship or degree of superimposition thereof. As previously mentioned, this relationship can be adjusted by adjusting either the microscope specimen 32 in x or y directions, or correspondingly adjusting the transparency 84 in mutually perpendicular directions, either one of which will change the relationship of the two individual images producing the resultant composite image 114 of FIG. 1G.

The upper microscope portion 20 can be arranged for direct viewing of the resultant composite image 114 by a human eye in an entirely conventional manner for compound microscope viewing, and this may be monocular viewing or binocular viewing, and in the latter case, can be of a stereoscopic type if desired. These various kinds of eyepiece arrangements are conventional and can be provided as desired or needed with means well-known in the art for beam splitting in the case of binocular viewing, etc., and it is thought that no detailed description thereof is necessary or desirable and, indeed, would be redundant, in view of the state of the art.

Also, the eyepiece lens means 24 can be provided with photographic apparatus holder means for mounting a camera so the resultant composite image 114 of FIG. 1G can be photographically recorded, rather than being directly visually viewed by the human eye. This has certain advantages because of increased sensitivity of film as compared to the human retina and further, because film can be of an ultraviolet radiation-sensitive type which the human retina is not and this makes possible enhanced magnification and/or resolution of the overall apparatus and has certain other advantages.

Also, the eyepiece lens means 24 can be provided with another type of receptor, such as the television camera indicated generally at 116 and which, in the example illustrated, is preferably of the solid state type which has certain substantial advantages over non-solid state type of cameras where precise measurements from precise locations of a specimen are desired to be made (less important in self-calibrated "chopper" form of invention.) In any case, the output of the television camera (an electrical signal) is fed through appropriate lead means, indicated at 118 to a closed circuit television system indicated in block diagrammatic form at 120, which in turn, feeds into a television monitor or picture tube indicated generally at 122 where the magnified resultant composite image corresponds to that shown at 114 in FIG. 1G and can be viewed in very precise detail and where appropriate relationships and/or measurements can be ascertained or even measured as desired or needed.

In the particular form illustrated, the television monitor or picture tube 122 is preferably also of a solid state type, although not specifically so limited in all forms of the invention, for substantially the same reasons that the television camera 116 is also preferably of a solid state type. Locations and measurements can be more precisely ascertained with such a solid state overall closed circuit television system than with nonsolid state closed circuit television systems and that is the primary reason for this preference. However, under certain conditions of use, non-solid state or partially non-solid state television systems may be used in lieu of the specific arrangement described and illustrated in FIG. 1.

In the exemplary form of the invention illustrated in FIG. 1, and 2, the support panel or stage 30 is mounted in a substantially fixed and horizontally-levelled position on an underlying base indicated at 124. This may be by multiple adjustable levelling screws or mounting posts 126 or otherwise accomplished where the end result is substantially the same.

Inasmuch as the support panel or stage 30 is fixed in the exemplary form illustrated, it becomes necessary to mount the entire microscope, and all portions thereof, for relative movement (in the example illustrated, in both x and y directions) with respect to the fixed support panel or stage 30. In the example illustrated, this is accomplished by the provision of a rigid upstanding bifurcated frame indicated at 128 which mounts the entire microscope for lateral movement along three parallel rods 130 in the case of the two outside rods, and 132 in the case of the center rod which is also part of the lateral movement mechanism as will be described hereinafter.

The microscope is also mounted for fore and aft movement relative to the fixed platform 30 by another set of three parallel rods 134 in the case of the two outermost rods and 136 in the case of the center rod which is also part of the fore and aft movement mechanism which will be described hereinafter. The first above-mentioned set of laterally-directed rods 130 and 132 are mutually perpendicular to the second-mentioned set of fore and aft rods 134 and 136 and in the first case, are for providing x axis movement to the microscope and in the second case, are for providing y axis movement to the microscope.

In the example illustrated, there is an intermediate mounting panel 138 (comprising plate means 139 and angle iron means 141), which carries both of the two sets of three mutually perpendicular mounting rods (130 and 132 in the first case, and 134 and 136 in the second case) passing through the intermediate member 138 in mutually perpendicular x and y directions and movable relative to each of said sets of rods in accordance with the operation of an effective lateral lead screw actuator 140 and in accordance with the effective operation of a fore and aft lead screw actuator 142.

The operation of said two effective lead screw actuators 140 and 142 will be described in greater detail hereinafter. For the moment, it should suffice to say that when relative rotation occurs between the lateral lead screw actuator 140 and the center rod 132, relative lateral movement occurs corresponding to the direction of said relative rotation and since the ends of the rod 132 are laterally captive, this means that the intermediate member 138 correspondingly moves laterally in the x axis direction.

Similarly, when the other fore and aft actuator 142 is rotated relative to the central rod 136, the relative longitudinal, or fore and aft, positioning of the intermediate member 138 with respect to the central rod 136 produces relative fore and aft longitudinal displacement therebetween. In the example illustrated, inasmuch as the fore and aft position of the upperpart of the intermediate member 138 is already determined by the three lateral rods 130 and 132, said fore and aft relative longitudinal displacement involves movement in a fore and aft direction of the central actuator rod 136 (and correspondingly, of the other two parallel rods 134) with respect to the upper part of the intermediate member 138 and, inasmuch as the structural member 144 carrying the entire upper microscope portion 20 is fastened to the front ends of the three fore and aft rods 134 and 136, the fore and aft movement of said rods 134 and 136 as a result of operation of the fore and aft or y axis actuator 142 causes corresponding fore and aft movement along an imaginary y axis of the entire upper microscope portion 20, the television camera 116 and the microscope focusing mechanism, etc. generally indicated by the reference numeral 26. Also, it will be understood that operation of the lateral or x axis actuator 140 causes the intermediate member 138 to move laterally along an imaginary x axis, which correspondingly moves the entire upper microscope portion 20, the television camera 116 and the focusing mechanism 26 laterally along an imaginary x axis. The portion of the bottom illuminator 36 which is intended to be vertically aligned with the central optical axis 40 of the microscope must move with the upper microscope portion 20 along the x axis or the y axis or any combination thereof, and, in the exemplary form illustrated in FIGS. 1 and 2, this is accomplished by having a linkage or coupling block 146 carrying a vertical tie rod 148 connected at 150 to a bottom-positioned fore and aft tie rod 152. Also, the microscope mounting plate 144 has an effective downward extension 153 with an engagement head 155 at the bottom, coupled to and engaging the fore and aft tie rod 152. This arrangement causes simultaneous movement to occur between said two top and bottom portions of the complete microscope for proper alignment thereof along the optical axis 40. However, the arrangement illustrated is exemplary only of many different forms which this coupling may take, and is not to be construed as specifically limiting the invention to the particular coupling arrangement illustrated and just described. The same equivalency statement for covering other corresponding structures within the broad scope of the present invention also applies to the lateral actuator 140 and the longitudinal or fore and aft actuator 142. In other words, the particular arrangement illustrated and just described is highly advantageous, but various other lead screw arrangements or lateral and/or longitudinal drive arrangements are intended to be included within the broad scope of the present invention.

Each of the two actuators 140 and 142 is shown as being of a similar type and one of these will be singled out for detailed description, and is to be considered as representative of the other actuator also. As is perhaps best shown in FIG. 1H, each such actuator 140 includes two separate block portions 154 and 156, each having half of a through-hole 158 and 160 through which the central rod 132 passes and with a small clearance space being positioned between the slightly oversized hole defined between the two block portions 154 and 156. Incidentally, the block portions 154 and 156 are fastened together with biasing springs 161 and threaded fasteners 162 which may take the form of Allen screws or the like (although not specifically so limited.) This facilitates each mounting of the two block portions 154 and 156 around the rod 132 even when it is already in place in the framework or other mounting structure holding same. The two block portions 154 and 156 carry a plurality of bearings (three, front and back, in the example illustrated, although not specifically so limited,) with each of the outer cylindrical portions 164 of the bearings in a position for contact with and rolling engagement with respect to, the corresponding outer peripheral portion of the central rod 132 and with all of the bearings, indicated generally at 166, being in similarly canted relationship to the direction of driven rotation of the central rod 132. Incidentally, the central rod 132 may be mounted for reversible manual rotation, or for motor-driven reversible rotation such as by the reversible electric motor 168 in the case of the lateral actuator 140 or the reversible motor 170 in the case of the fore and aft actuator 142. The important point to note is that as the central rod 132 is rotated in one particular direction, the canted rolling engagement of each of the two sets of three bearings 166 converts the rotary movement of the rod 132 into movement of the entire block assembly 154 and 156 into linear movement along the length of the rotating rod 132 - - in other words, the apparatus functions as a linear actuator converting rotary movement into linear or translatory movement.

The fore and aft actuator 142 functions in the same manner, except that since the actuator block 142 (the equivalent of the upper block portion 154 and the lower block portion 156 of FIG. 1H) is not free to move in a fore and aft direction, the power-rotated central rod 136 (which corresponds to that shown at 132 in FIG. 1H) itself moves in a fore and aft direction relative to the composite actuator block 142. This, of course, is permitted by reason of the fact that the other two fore and aft rods 134, in addition to the central power-driven rod 136, are all slideably mounted in the fore and aft actuator composite block structure 142.

The particular type of linear actuators just described as being shown at 140 and 142 provide certain advantages, such as the fact that they are not prone to damage at the end of the operating range of permissible movement as can occur in prior art positively coupled lead screw arrangements, because whenever an end abutment is reached by the moving portion of the type of actuator just described, it merely slips with no damage occurring. Furthermore, it is possible to rapidly re-position the microscope apparatus to any desired region by merely manually forcibly overriding either the x axis lead screw or the y axis lead screw and this can be easily accomplished without any damage to the apparatus whatsoever.

The focusing apparatus indicated generally at 26 is conventional and is arranged to vertically relatively move and effectively focus the upper microscope portion 20 as a result of adjustments manually applied thereto and to the focusing adjustment knobs 171 and 172.

As previously mentioned, in the particular example illustrated, the television camera 116 is preferably of an industrial solid state type, one exemplary, but non-specifically limiting form of which may be of a so-called two to one interlaced picture type wherein there are two separate scanned frames having alternate scanning lines interlaced with each other to produce a composite field. This type of solid state industrial picture arrangement will often have each frame scanned sixty times a second, and since there are two such frames in one complete field, the composite field is repeated at thirty times per second. However, this is merely described to exemplify one relatively high resolution system which has been found to be very effective with the rest of the apparatus, but is not to be construed as specifically limiting the invention thereto.

Since the mixer 44 must move along with the upper microscope portion 20 and the lower aligned part of the bottom illuminator means 36, that means that all of the optical inputs provided by the fiber optic light pipes such as shown at 64, 90, and 72 in FIG. 1 (and the corresponding light pipes shown in certain of the other figures) must be flexible in order to permit the necessary x and y axis movement of all of the portions of the microscope centered on the central optical axis 40 if the corresponding inputs to said light pipes is fixedly mounted, either on its own fixed mount or attached to one of the upstanding frame portions 128 or to any other fixed part of the apparatus. In the event that the corresponding inputs to said fiber optic light pipes are also movably mounted as are the output ends thereof to allow for x axis or y axis movement of the complete apparatus, then the flexible feature of the light pipes is no longer significant or necessary.

It should be noted that in many forms of the present invention, where fiber optics "light pipes" have been illustrated and described, they have been employed because they provide an effective, flexibly-mounted, assembled structure and make it possible to locate the initial light sources (lamps, etc.) adjacent to each other at one convenient location and, if desired, on a single mounting structure, etc. However, it should be clearly understood that the invention is not so limited, but may employ such "...initial light sources (lamps, etc.)..." directly (usually with shutters) and without the intermediary intervention of such fiber optics "light pipes", if desired - - and all within the broad scope of the present invention.

In the specific example illustrated, the previously-mentioned intermediate mounting panel or member indicated generally at 138, comprises the vertically-mounted plate 139 carrying the effective lateral lead screw actuator 140 at a vertically intermediate location thereon and laterally receiving the central actuator rod 132 therethrough between the previously-described upper and lower block portions 154 and 156 and which, by reason of the six similarly canted parallel bearings 166 effectively form the lateral actuator generally indicated by the reference numeral 140. The intermediate vertical plate 139 has fastened to an upper portion thereof, a longitudinal bearing 174 which is laterally directed and relatively slideably receives therethrough the upper rod 130 fastened between the two lateral upright portions of the upstanding frame 128. Similarly, the intermediate plate 139 carries at a lower location thereon, another longitudinal slideable bearing indicated generally at 176 which laterally slideably receives therethrough, the previously-mentioned lower laterally directed rod 130 for relative lateral slideable movement therebetween. The arrangement is such that the two upper and lower laterally directed slideable bearings 174 and 176 mounted on the two upper and lower transverse mounting rods 130 provide a very effective x axis mounting for the entire lateral actuator 140 and the plate 139 mounting same so that relative rotation of the central lateral actuator rod 132 by either the manual control knob 178 or the controllably operable reversible motor 168 will cause the central actuator rod 132 to rotate in a direction such as to leftwardly move the intermediate plate 139 and the lateral actuator 140 or to rightwardly move same, relative to the non-moving upstanding frame 128. Thus, the x axis movement of the intermediate plate 139 is clearly provided for very specifically by the exemplary representative, but non-limiting form of lateral actuator means and mounting means therefor, just described in considerable detail.

The top end of the vertically-oriented intermediate plate 139 has fastened thereto a pair of oppositely-directed angle irons 141 which may be bolted into place or may be welded or otherwise suitably affixed to the top edge of the intermediate plate 139 so that the two top frontwardly and rearwardly directed flanges of the two angle iron members 141 may effectively comprise what might be termed a top-positioned horizontal platform 180 carried by the top edge of the intermediate plate 139 and upon which the previously-mentioned fore and aft actuator 142 is attached with its axis perpendicular to the axis of the lateral actuator 140 - - that is, being oriented in a fore and aft or y axis direction on the effective horizontal platform 180. It may be fastened thereto in any suitable or appropriate way, and it receives through the center thereof, the previously-mentioned central-positioned fore and aft actuator rod 136 which cooperates with the six similarly canted bearings 166' in a manner similar to that previously described in representative detail relative to the lateral actuator 140. It should suffice to say that when the fore and aft central actuator rod 136 is power rotated by a motor such as is indicated at 170 or by a manual operating knob similar to the lateral actuator operating knob shown at 178, the split upper and lower blocks 154' and 156' of the fore and aft or y axis actuator 142 will be relatively moved with respect to said central actuator rod 136 and inasmuch as the body of the fore and aft actuator 142 is fixed on the platform 180 which is constrained against fore and aft movement, that means that the central actuator rod 136 will be the part which moves in a fore and aft direction determined entirely by the direction of rotation of the central actuator rod 136.

The plate 180 also carries two longitudinal slide bearings 182 and 184 generally similar to the two laterally directed slide bearings 174 and 176 previously described, and each of said fore and aft slide bearings 182 and 184 carries longitudinally therein a corresponding one of the two laterally-spaced forwardly directed slide mounting rods 134 so all three fore and aft rods comprising the two slide mounting rods 134 and the central actuator rod 136 can move fore and aft or in a y axis direction relative to the upright mounting plate 139.

The front ends of the three fore and aft rods 134 and 136 are attached to the previously-mentioned mounting member 144 which carries the entire upper microscope portion 20, the television camera 116, the focusing mechanism 26 and also by reason of a downward extension member 186, carries the mixer 44 and, by reason of the downward and rearward extension member 153 connected at 155 to the forwardly-directed tie rod 152, carries the (condenser 56 of the) central bottom portion of the bottom illuminator means 36 so that it will remain aligned with, and centered on the optical axis 40 at all times and irrespective of x or y axis movement caused by operation of either the lateral actuator 140 or the fore and aft actuator 142.

This is the arrangement illustrated in the first exemplary form of the invention shown in FIGS. 1-3, inclusive, but is not to be construed as limiting the invention thereto; in any way whatsoever. The member 153, and the connection thereof to the tie rod 152 and the condenser 56 of the central bottom portion of the lower illuminator means 36, is provided mainly for rigidity purposes and may be modified substantially or certain portions thereof (or, in some cases, all thereof) may be eliminated entirely if sufficient rigidity is otherwise provided for, and/or is otherwise present.

The lower portion of the plate (or extension member) 186 is provided with left and right lateral or transverse branches (or extension) 186L and 186R, respectively, extending to the left of, and the right of, the mixer 44, respectively; and there carrying output and input portions, respectively, of the top illuminator means with the right portion 186R carrying both input and output portions of the pattern or image generator means 78, etc., all laterally aligned with the corresponding one of the two opposed left and right lateral input openings 188 in corresponding left and right sides of the optical mixer 44. The arrangement is such that the pattern or image slide transparency 84 will be properly laterally aligned with the right-side lateral input opening 188 of the optical mixer 44 and the angularly upwardly directed mirror 46 and so the distance from the center of the mirror 46 rightwardly to the image or pattern-generating transparency 84 will be the same as the distance from the mirror 46 downwardly to the specimen 32 on the support panel or stage 30.

The downward extension member 186 may, in one optional form of the invention similar to the showing of FIG. 1 ( And FIG. 1A), also be provided with a left lateral extension 186L carrying the previously-mentioned part of the top illuminator means 34 which directs the top illuminating light rays 42 into the downwardly angularly facing partially silvered mirror 47 for direct downward deflection of said top illuminating light rays onto the top of the specimen 32 resting on the support panel or stage 30. In the example illustrated, this is accomplished by mounting at least the output end 62 of the top illuminator light pipe 64 in laterally offset relationship to the downwardly angularly facing partially silvered mirror 47, which, in the example illustrated, will place said output end 62 of the top illuminator light pipe 64 in opposition to, and directly laterally aligned (slightly modified therefrom as described on pages 15A and 15B) with the opposite side of the mixer 44 and facing the angularly upwardly directed other partially silvered mirror 46. The top illuminator lamp 38 can be separately mounted, such as on one of the frame uprights 128 or otherwise (which is permitted, because of the flexibility of the fiber optic light pipe 64), or it can be mounted on a right lateral extension 186R of the lateral extension part of the downward extension 186 carrying at least the output end 62 of the top illuminator light pipe 64 (and, in some cases, carrying same entirely.) The arrangement is such that everything which is required to remain in a predetermined or selected relationship to the optical axis passing through the central part of the mixer 44 will all move together along with the upper microscope portion 20 during x axis adjustment by the lateral actuator means 140 or y axis adjustment during fore and aft movement by operation of the fore and aft actuator means 142 so that all of said parts remain in the proper optical relationship to one another during such movement. Z-axis (or "zoom") adjustment includes all of said parts except the bottom illuminator 36.

In certain alternate forms, the extension member 186, may have a lower extension 190 which may be curved or bent so as to be capable of bypassing and extending below the support panel or stage 30 to a lower position where it then extends inwardly to, and carries the central bottom portion of the bottom illuminator means 36 so that it will remain aligned with and centered on the optical axis 40 at all times and irrespective of x or y axis movement caused by operation of either the lateral actuator 140 or the fore and aft actuator 142.

In certain forms, a supplementary additional downward extension 190 of the downward extension member 186 may also be provided with, and may similarly include, a right-transverse branch 186R extending into a laterally offset position relative to the side of the mixer 44 and directly laterally-aligned (slightly modified therefrom as described on pages 15A and 15B) with the right side lateral input opening 186 of the mixer 44, irrespective of x or y axis movement of the mixer 44 so the pattern or image generator 78, and in particular, the pattern or image slide transparency 84 will be properly laterally aligned with the right-side lateral input opening 188 of the mixer 44 and the angularly upwardly directed mirror 46 and so the distance from the center of the mirror 46 laterally to the image or pattern generating transparency 84 will be the same as the distance downwardly from the mirror 46 to the specimen 32 on the support panel or stage 30.

The above-described slightly modified arrangement (including the extra downward extension 190 on the downward extension member 186 form of the invention) is shown fragmentarily in FIG. 1J.

An alternate arrangement is partially shown in FIG. 1P and in FIG. 1T; it being understood that the rear ends of the three fore and aft rods 134 and 136, the coupling member 146, the tie rod 148, the connection link 150 and the rear end of the forwardly directed tie rod 152 (as well as the forward end of said tie rod 152 and the condenser 56 of the lower illuminator means 36) are all similar to the showing of said parts in FIG. 1R - FIG. 1T (of similar aspect now showing said parts again because front and rear portions of the apparatus shown in fragmentary side elevation in FIG. 1T are broken away for drawing space-limitation reasons.) Therefore, refer to FIG. 1R for drawing details of said parts. In this alternate arrangement, the rear ends of the three fore and aft rods 134 and 136 of the fore and aft actuator 142 are coupled by a coupling member 146, a tie rod 148, a connection link 150 and a forwardly directed tie rod 152 to the previously-mentioned centrally positioned bottom-located portion of the bottom illuminator 36 which is to remain centered on the optical axis 40. The bottom of the previously-mentioned plate 139 has a downwardly directed bifurcated portion 192 which engages the forwardly directed tie rod 152 for laterally shifting it in exact correspondence with lateral shifting movement of the plate 139 in response to operation of the lateral or x axis actuator 140.

FIG. 1K shows, in very fragmentary form, a slight modification of the upper illuminator 34 shown in FIG. 1 . In the FIG. 1K showing of a slight modification thereof, there are three such upper illuminators 34, each downwardly directed in a slightly inwardly angularly canted relationship with respect to the optical axis 40, so that the light incident upon the top of the specimen 32 will be oblique light, thus, illuminating said specimen 32 by what is generally termed "dark-field" illumination. In certain cases, in this modification, the relative position of the modified top illuminator light output ends of the top illuminator fiber optic light pipe 64 may be relatively differently positioned with respect to the mixer 44, which may be moved, or temporarily removed, if desired. In this modification shown in FIG. 1K, the fiber optic light pipe 64 may be of a somewhat different type, wherein it contains a pre-determined number of optical fibers, all of which are present in end abutment at the input end 60 thereof, while said initial number of optical fibers is effectively divided in thirds at a separation junction 194 where the light pipe 64 effectively splits into three output portions having three output ends 62 and each of which contain one-third of the original number of optical fibers present at the input end 60 of the light pipe 64. This is a convenient arrangement for dividing the source light from the source lamp 38 into three equal parts. However, the invention is not so limited, and other substantially equivalent arrangements may be used in lieu thereof.

FIG. 1L illustrates another form of top illuminator 34 employing a ring-shaped output end 62 having individual optical fibers distributed around the ring at said output end so as to direct a ring of light downwardly and inwardly relative to the optical axis 40 so that the oblique cone of top illuminating light will also produce illumination of the specimen 32 in what is termed a "dark-field" manner.

FIG. 1M illustrates in very fragmentary form a slight modification of the beam splitter shown at 94 in FIG. 1A, and which is generally designated at 94' in FIG. 1M. It is shown as comprising a type of lamp 38a' which is positioned within a reflector 196 and which has its filament 198 longitudinally arranged. This type of light customarily produces two so-called "hot spots" of light laterally offset from each other, and separated by a central portion of much lesser intensity. Therefore, this characteristic of the particular lamp can be used to cause it to function as an effective beam splitter, functionally equivalent to the beam splitter 94 shown in FIG. 1A, and capable of feeding two substantially equal intensity laterally displaced beams of bright light to the input ends 60a' and 70a' of the two upper and lower light pipes 64a' and 72a' Otherwise, this modified beam splitter of FIG. 1M is generally similar to the beam splitter 94 of FIG. 1A, and no further detailed description thereof is thought to be necessary or desirable.

FIG. 1N merely illustrates another alternate beam splitter functionally equivalent to the beam splitter 94 shown in FIG. 1A, or the slightly varied effective beam splitter 94' shown in FIG. 1M. As shown in FIG. 1N, the beam splitter 94" merely comprises the division of one fiber optic light pipe 64a" into two fiber optic light pipe output sections 65 terminating in two output ends 62a" and 74a" which may be substituted in lieu of the beam splitter 94 of FIG. 1A, or the beam splitter 94' of FIG. 1M in a complete functional system of the type shown in FIG. 1A, or in any of the other systems illustrated in any of the other figures.

It should be noted that the chopper such as that shown at 92 in FIG. 1A, or the varied forms thereof shown in any of the other figures, may preferably be operated in synchronism with the television picture tube scanning rate or field or frame repetition rate, so that there will be no problem in obtaining a good stationary composite resultant picture of the specimen image and the pattern image in effectively superimposed relationship as shown in FIG. 1G. This may be accomplished by the coupling line 101 in FIG. 1A, 101b in FIG. 1C , and 101c in FIG. 1D and corresponding free-running oscillators 103, 103b and 103c, or by any other equivalent arrangement. In certain instances, it is possible that a non-synchronous relationship might be desired and this is within the broad scope of the present invention also.

The alternation of the two images as disclosed in FIG. 1A, or in various subsequent figures showing modifications of the means for producing such image alternation, is desirable, because of the fact that the two images are combined in the form of light patterns and various portions of the two different images which lie directly on top of a portion of the other image may, in certain instances, partially or wholly cancel each other out. For example, if a light portion of one image is superimposed on a dark portion of the other image they will effectively neutralize each other, in whole or in part, and have a detrimental effect on the resultant composite image, which is to be produced from the combination of the two images, similar to that shown in FIG. 1G, for example. However, when the two images alternate, there is no such cancellation and that is the reason for the various different modifications of means for producing rapid alternation of the two images, beginning with FIG. 1A, and shown in various modifications in other subsequent figures of the drawings. However, in certain cases, there may be other means employed in apparatus of the general FIG. 1 type for preventing interference between the two images, without rapidly alternating the two images, and all such are intended to be included and comprehended herein as being within the broad scope of the present invention. For example, the two different images could be presented in effectively mutually non-interfering manners by using color filters and/or different plane polarizing means for the two different images. The reception of the two non-interfering images could similarly be isolated from each other by color filters and differently-oriented polarization means, or any other functional equivalent capable of causing non-interference of one of the images with the other image, so they could, in effect, both be viewed (which includes the meaning of the reception thereof by the television camera 116) in the proper superimposed relationship to each other.

It should be noted that the specimen 32 may be viewed while lying in a substantially flat position on the supporting panel 30 and may have its image placed in a vertically-aligned relationship with respect to a similarly-shaped pattern image in what might be termed a manner somewhat like a stencil, or an outlining pattern lying just outwardly adjacent to all of the corresponding edge portions of the specimen image 32, so as to determine whether all parts of the specimen 32 are properly shaped, positioned, and dimensioned by quickly viewing the correlation thereof to the effective stencilling overlay pattern of the pattern or image superimposed thereon and of a type such as independently indicated at 112 in FIG. 1F.

Also, such a specimen may be edge-positioned on the supporting panel 30 and after re-focusing the upper microscope portion 20, it may be viewed with a different and corresponding edge-shaped overlay image aligned and effectively outlining same in a manner somewhat like a stencil and with said different pattern or image being produced by a different transparency 84 defining the proper edge pattern or overlay image. It is also possible for prongs or parts across the top surface of the specimen 32 to be checked as to position, shape, and dimensions by having the overlay pattern show the outline of such parts within the limits of the exterior configuration of the complete specimen 32, the overlay pattern image 112 and the plan view area defined therein.

Various other viewing positions of the specimen and corresponding changes of the overlay image transparency 84 corresponding thereto may all be employed within the broad scope of the present invention.

It should be noted that in the exemplary first form of the invention illustrated, the y axis fore and aft actuator 142 may be arranged so as to have a fine adjustment knob 200 positioned on the front side of the plate 144 for convenient manual accessibility by a user of the apparatus from a position in front of the apparatus. Of course, it should be understood that adjustment of the y axis manual fine position adjustment knob 200 effectively rotates the centrally positioned actuator rod 136 which cooperates with the y axis drive block and causes fore and aft movement along a y axis of the entire front assembly carrying the upper microscope portion 20 and the television camera 116. Various arrangements for a reversible motor drive and/or the manually operable fine position adjustment knob for the y axis linear actuator 142 may be employed, but the arrangement just described is an advantageous one, and provides a convenient structure, easy to operate from the front of the entire apparatus.

Incidentally, in the exemplary first form illustrated, the previously-mentioned knob 171 comprises a coarse vertical position adjustment knob on a pinion gear positioned therebehind, and not visible in FIG. 2 cooperating with the rack structure indicated at 204 for vertically adjusting the entire forward vertical member 186 carrying the previously-mentioned downward extension of the member 186 which both mounts the television camera 116 and the lower-positioned mixer 44 - - all for coarse vertical adjustment. The vertically-slideable member 186 may be alignedly constrained for vertical movement only in a number of different ways, such as by the use of "v" ways, or other functional equivalent. Additionally, in the example illustrated, there is a vertical slide assembly 208 for fine vertical positioning adjustment for providing an extremely fine focusing adjustment structure for the upper microscope portion 20, as is indicated generally at 208 and comprises a worm screw and a worm, and means comprising the knob (or wheel-crank) 172, for relatively rotating same to provide very fine vertical positioning adjustment of the upper microscope portion 20, in addition to the coarse vertical positioning adjustment provided by the coarse adjustment assembly indicated generally at 204 and 171. The relative rotation of the worm screw and worm wheel of the fine vertical positioning assembly, indicated at 208, is provided by the vertical fine focus knob 172 positioned at the top of the assembly in a convenient location for a frontally positioned user of the apparatus.

The structures just described are illustrative only, and may assume a number of different variations, all within the broad scope of the present invention, and are intended to be included and comprehended within said broad scope of the present invention.

It should also be noted that in the various modified forms of the invention beginning with FIG. 1A, and thereafter, wherein the overlay pattern image is to be effectively alternately superimposed in a desired relationship relative to the specimen image and wherein various forms of the chopper have been used for this purpose, such as the one shown at 92 in FIG. 1A, the positioning of the chopper need not be between the light source and the overlay pattern image transparency 84 in the one case, and the specimen 32 in the other case, but said chopper can be located downstream of the production of the corresponding image - - in fact, anywhere so that the alternation of the two images, that is, the overlay pattern image, and the specimen image occurs, and all such arrangements or functional equivalents thereof are intended to be included and comprehended within the broad scope of the present invention.

For the sake of clarity of understanding, it should be noted that the pair of back-to-back, angularly inclined, partially light-transmissive, partially light reflective, oppositely-facing, partially-silvered mirrors 46 and 47 of the mixer 44 of the first illustrated form of the invention, may be said to effectively comprise one exemplary, representative, but non-specifically-limiting form of "...beam splitter...", but that other substantially functionally equivalent structures may be used in lieu thereof, and that all such are intended to be included and comprehended herein.

Furthermore, it should be noted that the term, "beam splitter", as used in connection with the descriptions of FIGS. 1M and 1N, is a functional term describing what the so-called "beam-splitter 94 actually effectively does, although its usage differs somewhat from the common trade-practice usage of that terminology. In the light of the above clarification, its usage should be completely understandable and definite.

Additionally, it should be noted that the distance between the composite effective beam splitter 46 & 47 (and, in particular, the mirror 46 thereof) and the specimen 32 on the panel 30, versus the distance between said composite effective beam splitter 46 and 47 (and, in particular, the mirror 46 thereof) and the overlay image transparency 84, remain the same, despite any z-axis (or "zoom") adjustment of the upper microscope portion 20 of the representative first form of the invention shown in FIGS. 1 and 2. The relative focusings of both the specimen image and the overlay or pattern image (and any calibration(s) associated therewith) remain the same and in the precisely correct relationship to each other. In other words, all focusing and/or adjustment changes which occur after the mixer 44 in the optical system (microscope or any other optical system) in the television camera system, and/or in the television picture-reproducing system (or in between) happen to the complete resultant, composite image (and to the specimen image, the overlay pattern image, and to any calibration images, involved in producing said composite image.) Thus, it is possible to examine a complete specimen, under low-power, and to then "zoom" in, or otherwise change the power of the microscope optical system, so as to examine only a selected small part of the complete specimen, under high-power, without, in any way, disturbing the relationship of the specimen image to the overlay pattern image, and any calibrations and/or calibration images associated with, or forming a part of the complete resultant composite image. This is a vitally important result, and cannot be matched by known prior art would-be comparator and/or calibration-comparing arrangements.

Please note that the first form of the invention previously described in detail (and, also, any of the other forms of the invention described elsewhere hereinbefore) may, optionally, in certain forms thereof, be provided with x-axis digital scale means, indicated generally at 212, and/or y-axis digital scale means, indicated generally at 214 (and, if desired, even z-axis scale means, although such are not illustrated in the drawings, but are to be understood as possible within the broad scope of the present invention and of construction similar to that indicated at 212 and/or 214, for example, although not so limited.) As optionally shown, the x-axis digital scale 212 is a longitudinal scale mounted effectively parallel to, and effectively adjacent to the centerline of the x-axis actuator central actuator rod 132, while the y-axis digital scale 214 is a longitudinal scale mounted effectively parallel to, and effectively adjacent to the centerline of the y-axis actuator central rod 136 (in the example illustrated, being carried on the rod surfaces, but not limited thereto.)

Of course, it should be understood that the foregoing descriptions of the x-axis digital scale means 212 and of the y-axis digital scale means 214 and the representative showings thereof in the drawings are, primarily, representative of the concepts involved and are not to be construed as limiting the invention to the particular structures and methods so illustrated and so described. Rather, the invention is directed to the broad generic concepts involved in x-axis and y-axis position-indicating means (or displacement-indicating means showing displacement from a zero reference location or position, etc.). In actual usage, I find an optical reader (usually a digital optical reader) to be very practical for an effective x-axis digital scale means 212 and a second optical reader (usually a digital optical reader) to be very practical for an effective y-axis digital scale means 214.

In each such case, a typical optical reader would include first and second relatively movable reader portions, with a first one of said reader portions including a light-emitter, a spacing gap, and a photosensitive light-receiver on the opposite side of the spacing gap from the light-emitter and aligned therewith to receive a light beam emitted by the light-emitter and normally passing across the spacing gap to the photosensitive light-receiver, and with the other one (a second one) of said reader portions, being relatively longitudinally movably positioned in said spacing gap and comprising a position-intelligence-carrying and displacement-intelligence-carrying longitudinal light-beam-modulating scale member or bar (an x-axis light-beam-modulating longitudinal scale member in the case of the x-axis digital scale means 212, and a y-axis light-beam-modulating longitudinal scale member in the case of the two different photosensitive light receivers (of the corresponding x-axis scale means 212 and of the corresponding y-axis scale means 214) will be modulated by the corresponding one of the two different x-axis and y-axis light-beam-modulating scale members or bars and will be electrically powered and connected to the corresponding one of two different digital display units - - one an x-axis display unit, and the other, a y-axis display unit, which provide easily visibly observable displays showing all x-axis movements of the x-axis actuator 140 and all y-axis movements of the y-axis actuator 142.

In each case described above, each of the first and second ones of said reader portions is arranged to be effectively physically coupled to the corresponding one of the two different relatively movable portions of the corresponding x-axis actuator 140, and a similar arrangement is also provided for the y-axis actuator 142, for similar effective coupling with respect thereto, (or to correspondingly relatively movable parts of the structures effectively coupled thereto.)

Similar structures may also be provided to visibly display all z-axis movements of the upper microscope portion 20, if desired, and such are intended to be included and comprehended within the broad scope of the present invention, etc.

It should be noted that in many of the different figures of the drawings, various parts are removed for reasons of clarity, drawing simplification, and/or drawing space-saving reasons, etc. This does not, in any way, limit the disclosure or mean that such non-shown parts (non-shown in any particular individual drawing figure) are to be construed as not having been disclosed, because in all cases, all parts described are shown in at least some location, and at least some of the many different figures of the drawings so that the description of all parts can, in all cases, be found to be illustrated in at least one location (or more than one location) in the drawings. This provides an entirely adequate disclosure, but simplifies and clarifies the drawings.

FIG. 1Q fragmentarily illustrates a slight variation of the invention, wherein the bottom illumination means (shown at 36 in the first form of the invention illustrated) comprises a large-area flat-panel type of effective light-emitting means, generally indicated at 36q, and which may comprise an electro-luminescent light source, a woven optical-fiber light-emitting fabric (or mat), a diffusion-panel type of "...light box...", or other large-area, flat-panel type of upwardly-directed light emitter, which has the virtue of not requiring any x-axis movement or any y-axis movement when the specimen 32 of FIG. 1, and the rest of the complete upper apparatus, correspondingly move in either such direction.

FIG. 1R fragmentarily illustrates a slight modification of the FIG. 1A form of the invention, where all of the light sources (lamps) and, certainly, at least input ends of the various "light pipes" (and associated equipment, etc.) are more or less symmetrically positioned as viewed from the front of the complete apparatus), and in the non-limiting example illustrated, on a rear support member 216 mounted on a rear extension 218 of the underlying base 124 shown in FIGS. 1 and 2. Mechanically speaking, this is a very convenient mounting arrangement, and tends to minimize awkward flexural movements of the various "light pipes", etc., and, also, has other constructional and operational advantages.

It should be noted that the use herein of the words, "microscope", "microscopic", and "optical", either independently, or in combination, is not to be construed in a limiting sense, and does not necessarily imply that the images (either the specimen image, the overlay or reference pattern image, or the resultant composite image) is microscopically enlarged (although, it may be); and, further, does not necessarily imply that said images are to be directly viewed by the human eye (although they may be.)

Most of the claim language set forth hereinafter in claims 1 through 10 is thought to have been fully defined in the foregoing specification, particularly when read in the light of the accompanying figures set forth on the accompanying eight sheets of patent drawings, to an extent such that each and every term used in said claims can be said to be completely and fully definite and to meet all statutory requirements for definiteness. However, additional appended claims 11–16 contain certain claim language, including words, phrases, and terms, which may not have been fully and completely defined hereinbefore, and, therefore, the following "Nomenclature Listing" is set forth immediately hereinafter to fully define all of such words, phrases, and terms, and the claim language embodying same, as set forth in appended claims 11–16. The clarifying examples used in the following Nomenclature Listing to define certain terms used in appended claims 11–16 are representative only, and are not to be construed as limiting the broad generic claim language terms thereto.

NOMENCLATURE LISTING

The term "comparator apparatus" refers to the entire apparatus, which, in one specific form, as set forth in the first ten claims has been referred to as "microscopic viewing apparatus".

The term "first specimen image", corresponds to one specific form thereof comprising the specimen image 32' as shown in FIG. 1G, for example.

The term "second reference pattern image" corresponds to one specific form thereof as shown at 112' in FIG. 1G, for example.

The term "pattern image generator" or "pattern image generating apparatus" corresponds to one specific form thereof as indicated by the reference numeral 78 in FIG. 1, for example.

The term "composite-resultant-image-receiving-and-handling means" corresponds to the complete upper microscope portion indicated at 20 in FIG. 1 of the representative first form of the invention, for example.

The term "an input composite-resultant-image-receiving end" corresponds to one specific form thereof such as is shown at 22 at the bottom objective lens end of the upper microscope portion 20, as illustrated in FIG. 1, for example.

The term "output end" corresponds to the upper eyepiece lens means 24 of the representative first form of the invention as shown in FIG. 1, for example.

The term "intermediate composite-resultant-image-handling portion" corresponds to the entire lens system of the upper microscope portion 20 shown in FIG. 1 in the representative form, for example.

The term "first specimen-image-generating means" corresponds, in one representative form, to the optics of the representative microscope type comparator shown in FIG. 1 with specific reference to the top illuminator means 34, the bottom illuminator means 36 and the platform or table 30 supporting the specimen 32 thereon which, together, function to produce an image of the specimen 32, in one representative form of the invention.

The term "second reference-pattern-image-generating means" corresponds to the entire system for generating a reference image, and is shown in one representative form at 78 in FIG. 1, for example.

The term "optical-image-mixing means" (or "mixer") and the term "optical-image-mixing and combining means" corresponds to one particular non-limiting form thereof indicated in FIG. 1 at 44 in one representative form, and which functions to combine the reference image (such as that shown at 112' in FIG. 1G, for example) with the specimen image (such as that shown at 32' in FIG. 1G, for example), so as to produce the corresponding comparison-effective composite resultant image, one representative form of which is clearly shown in FIG. 1G, by the two reference numerals 32' and 112'.

The term "chopper means" has already been fairly well-described in the foregoing specification and one representative form thereof is clearly shown at 92 in FIG. 1A, for example.

The term "two different first and second image inputs" or the term "two different first and second image input signals" has already been fairly well defined in the earlier portions of the foregoing specification and may be said to comprise the first or specimen image directed upwardly from the specimen 32 carried on the transparent platform or table 30 and the second or reference image emitted as indicated at 76 in FIG. 1 from the output side of the film transparency 84 producing the reference image, as shown in FIG. 1.

The term "television apparatus" has already been quite well defined in the foregoing specification with reference to the language used in the first ten claims appended hereto and said definition also applies insofar as additional claims 11-16 are concerned.

The term "effective picture-element time-spreading means" has already been well defined in the earlier portions of the foregoing specification and said definition is also applicable to the language used in additional claims 11-16.

It should be understood that the figures and the specific description thereof set forth in this application are for the purpose of illustrating the present invention and are not to be construed as limiting the present invention to the precise and detailed specific structures shown in the drawing figures and specifically described hereinbefore. Rather, the real invention is intended to include substantially equivalent constructions embodying the basic teachings and inventive concept of the present invention.

What is claimed is:

1. A microscopic viewing apparatus including microscopic-specimen-image-generating means arranged to generate an optical microscope specimen image input and comprising; a microscope multiple lens means having microscope objective lens means, microscope eyepiece lens means, and selectively adjustable lens-position-adjusting focusing means for focusing on a focusing plane adjacent to a specimen support panel and coincident with a desired viewing plane of a real microscopic specimen positioned thereon, and, further, including a microscope illuminating means for illuminating in any desired manner, such a real microscope specimen positioned on such a support panel for viewing a microscope specimen image of a real microscope specimen positioned on an intermediate support panel and a desired selectively optically alignedly superimposed overlay pattern image in a selected superimposed relationship to the specimen image; comprising: separate specific-pattern-shaped optical overlay pattern-image-generating means arranged to optically effectively generate a desired type, shape and size of optical overlay pattern image input having at least a portion shaped similar to, and comparable to, and intended to effectively visibly observably overlay, an optical specimen image input of a real microscope specimen in an effectively predetermined and preselected relationship thereto, with said overlay pattern image input portion shaped similar to said specimen image input being positionable so as to be directly, point-by-point and/or line-by-line comparable with each other substantially over the area-extent thereof when said two image inputs are mixed and combined into a desired comparison relationship to form a comparison-effective resultant effectively composite image output; optical-image-mixing and combining means arranged to receive at least two different optical image inputs and to effectively mix and combine same into desired selectively optically superimposed relationship to form a resultant effectively composite image output for effective viewing by a microscope viewing apparatus alignedly positioned relative thereto and effectively optically coupled thereto, a first one of said two different optical image inputs comprising a microscope specimen image input and a second one of said two different optical image inputs comprising said separate optical overlay pattern image input.

2. A microscopic viewing apparatus including a microscope multiple lens means having microscope objective lens means, microscope eyepiece lens means, and selectively adjustable lens-position-adjusting focusing means for focusing on a focusing plane adjacent to a specimen support panel and coincident with a desired viewing plane of a real microscopic specimen positioned thereon, and, further, including a microscope illuminating means for illuminating in any desired manner, such a real microscope specimen positioned on such a support panel for viewing a microscope specimen image of a real microscope specimen positioned on an intermediate support panel and a desired selectively optically alignedly superimposed overlay pattern image in a selected superimposed relationship to the specimen image, comprising:

separate overlay pattern-image-generating means arranged to optically effectively generate a desired type, shape and size of optical overlay pattern image input intended to effectively visibly observably overlay an optical specimen image input of a real microscope specimen in an effectively predetermined and preselected relationship thereto; optical-image-mixing and combining means arranged to receive at least two different optical image inputs and to effectively mix and combine same into desired selectively optically superimposed relationship to form a resultant effectively composite image output for effective viewing by a microscope viewing apparatus alignedly positioned relative thereto and effectively optically coupled thereto, a first one of said two different optical image inputs comprising a microscope specimen image input and a second one of said two different optical image inputs comprising said separate optical overlay pattern image input; and effective alternating-image-cancelling-negating-interrupting optical chopper means adapted to effectively operate at a desired optimum repetition frequency rate, thus avoiding any image interference and/or image-cancellation effects, in whole or part, of either of said two different image inputs.

3. Apparatus as defined in claim 2, wherein the repetition frequency rate of operation of said chopper means is such as to cause an effective "persistency of vision" effect to result in the apparent effective viewing of both of said two image inputs when said resultant effectively composite image is effectively viewed by said microscope viewing apparatus.

4. Apparatus as defined in claim 3, wherein said microscopic viewing apparatus also includes effective television camera and television-picture-reproducing apparatus effectively coupled to said eyepiece lens means.

5. Apparatus as defined in claim 3, wherein said microscopic viewing apparatus also includes effective solid-state television camera and television-picture-reproducing apparatus effectively coupled to said eyepiece lens means and inherently including in said television apparatus, effective picture-element time-spreading means which functions to effectively enhance said effective "persistency of vision effect".

6. A microscopic viewing apparatus for viewing an effectively microscopically enlarged specimen image of a real microscope specimen positioned on a substantially planar horizontal intermediate support panel and a desired selectively optically alignedly superimposed overlay pattern image in a selected superimposed relationship to the specimen image, comprising: microscope-specimen-image-generating means arranged to generate an optical microscope specimen image input and including; a microscope multiple lens means having microscope objective lens means, microscope eyepiece lens means, and selectively adjustable lens-position-adjusting focusing means for focusing on a focusing plane adjacent to a specimen support panel and coincident with a desired viewing plane of a real microscopic specimen positioned thereon, and, further, including a microscope illuminating means for illuminating in any desired manner, such a real microscope specimen positioned on such a support panel; separate specific-pattern-shaped optical overlay pattern-image-generating means arranged to optically effectively generate a desired type, shape and size of optical overlay pattern image input having at least a portion shaped similar to, and comparable to, and intended to effectively visibly observably overlay, an optical specimen image input of a real microscope specimen in an effectively predetermined and preselected relationship thereto, with said overlay pattern image input portion shaped similar to said specimen image input being positionable so as to be directly, point-by-point and/or line-by-line comparable with each other substantially over the area-extent thereof when said two image inputs are mixed and combined into a desired comparison relationship to form a comparison-effective resultant effectively composite image output; optical-image-mixing and combining means arranged to receive at least two different optical image inputs and to effectively mix and combine same into desired selectively optically superimposed relationship to form a resultant effectively composite image output for effective viewing by a microscope viewing apparatus alignedly positioned relative thereto and effectively optically coupled thereto, a first one of said two different optical image inputs comprising said microscope specimen image input and a second one of said two different optical image inputs comprising said separate optical overlay pattern image input.

7. A microscopic viewing apparatus for viewing an effectively microscopically enlarged specimen image of a real microscope specimen positioned on a substantially planar horizontal intermediate support panel and a desired selectively optically alignedly superimposed overlay pattern image in a selected superimposed relationship to the specimen image, comprising: a microscope multiple lens means having microscope objective lens means, microscope eyepiece lens means, and selectively adjustable lens-position-adjusting focusing means for focusing on a focusing plane adjacent to a specimen support panel and coincident with a desired viewing plane of a real microscopic specimen positioned thereon, and, further, including a microscope illuminating means for illuminating in any desired manner, such a real microscope specimen positioned on such a support panel; separate overlay pattern-image-generating means arranged to optically effectively generate a desired type, shape and size of optical overlay pattern image input intended to effectively visibly observably overlay an optical specimen image input of a real microscopic specimen in an effectively predetermined and pre-selected relationship thereto; optical-image-mixing and combining means arranged to receive at least two different optical image inputs and to effectively mix and combine same into desired selectively optically superimposed relationship to form a resultant effectively composite image output for effective viewing by a microscope viewing apparatus alignedly positioned relative thereto and effectively optically coupled thereto, a first one of said two different optical image inputs comprising said microscope specimen image input and a second one of said two different optical image inputs comprising said separate optical overlay pattern image input; and effective alternating-image-cancelling-negating-interrupting optical chopper means effectively positioned upstream flow-path-wise from said optical-image-mixing-and-combining means for timedly alternately interrupting each of said two different optical image inputs, at a desired optimum repetition frequency rate, in a desired alternating relatively phase-displaced relationship so the two different image inputs will not co-exist for identical time periods but will alternately exist in said resultant effectively composite image output of said optical-image-mixing-and-combining means, thus avoiding any image interference and/or image-cancellation effects, in whole or part, of either of said two different image inputs.

8. Apparatus as defined in claim 7, wherein the repetition frequency rate of operation of said chopper means is such as to cause an effective "persistency of vision" effect to result in the apparent effective viewing of both of said two image inputs when said resultant effectively composite image is effectively viewed by said microscope viewing apparatus.

9. Apparatus as defined in claim 8, wherein said microscopic viewing apparatus also includes effective television camera and television-picture-reproducing apparatus effectively coupled to said eyepiece lens means.

10. Apparatus as defined in claim 8, wherein said microscopic viewing apparatus also includes effective solid-state television camera and television-picture-reproducing apparatus effectively coupled to said eyepiece lens means and inherently including in said television apparatus, effective picture-element time-spreading means which functions to effectively enhance said effective "persistency of vision" effect.

11. A comparator apparatus for effectively viewing and comparing a first specimen image with a second reference pattern image in an effective composite-resultant-image-viewing manner, comprising the provision of: composite-resultant-image-receiving-and-handling means effectively comprising viewing apparatus having an input composite-resultant-image-receiving end, an output end, and an intermediate composite-resultant-image-handling portion; a first specimen-image-generating means operable to effectively generate a first specimen image corresponding to at least some characteristic of a specimen object to effectively comprise a first specimen image input signal; a pattern-shaped second-reference-pattern-image-generating means operable to effectively generate a second reference pattern image of a desired type, shape and size having at least a portion similar to, and comparable, area-wise, to said first specimen image effectively producible by said first specimen-image-generating means to effectively comprise a second reference pattern image input signal; and image-mixing-and-combining means arranged to receive said first and second image input signals and to effectively mix and combine same into a desired comparison relationship to form a comparison-effective composite resultant image effectively comprising a corresponding comparison-effective composite resultant image input signal for effective feeding injection thereof into said composite-resultant-image-receiving end of said composite-resultant-image-receiving-and handling means.

12. A comparator apparatus for effectively viewing and comparing a first specimen image with a second reference pattern image in an effective composite-resultant-image-viewing manner, comprising: composite-resultant-image-receiving-and-handling means effectively comprising viewing apparatus having an input composite-resultant-image-receiving end, an output end, and an intermediate composite-resultant-image-handling portion; a first specimen-image-generating means operable to effectively generate a first specimen image corresponding to at least some characteristic of a specimen object to effectively comprise a first specimen image input signal; a second-reference-pattern-image-generating means operable to effectively generate a second reference pattern image of a desired type, shape and size having some desired relationship to said first specimen image effectively producible by said first specimen-image-generating means to effectively comprise a second reference pattern image input signal; and image-mixing-and-combining means arranged to receive said first and second image input signals and to effectively mix and combine same into a desired comparison relationship to form a comparison-effective composite resultant image effectively comprising a corresponding comparison-effective composite resultant image input signal for effective feeding injection thereof into said composite-resultant-image-receiving end of said composite-resultant-image-receiving-and handling means; and effective chopper means operable at a desired optimum repetition frequency rate to cause said first and second image input signals, as effectively mixed and combined in said image-mixing-and-combining means, to be effectively alternately present in real time so the two different images will not co-exist for identical time periods, but will effectively alternately exist in said comparison-effective composite resultant image input signal feedingly injected from said image-mixing-and-combining means into said composite-resultant-image-receiving end of said composite-resultant-image-receiving-and-handling means, thus avoiding any image interference and/or image-cancellation effects, in whole or in part, of either of said two different first and second image input signals.

13. Apparatus as defined in claim 12, wherein the repetition frequency rate of operation of said chopper means is such as to cause an effective "persistency of vision" effect, or effective equivalent thereof, whereby to result in the apparent effective comparison of said two different image inputs when said composite resultant image is effectively compared by the said comparator apparatus.

14. Apparatus as defined in claim 13, wherein said comparator apparatus also includes effective television apparatus comprising television camera and television-picture-producing apparatus effectively coupled to said output end of said composite-resultant-image-receiving-and-handling means.

15. Apparatus as defined in claim 13, wherein said comparator apparatus also includes effective television apparatus comprising television camera and television-picture-producing apparatus effectively coupled to said output end of said composite-resultant-image-receiving-and-handling means and includes effective picture-element time-spreading means operable to effectively enhance said "persistency of vision" effect, or effective functional equivalent thereof.

16. Apparatus as defined in claim 11, wherein said comparator apparatus also includes effective television apparatus comprising television camera and television-picture-producing apparatus effectively coupled to said output end of said composite-resultant-image-receiving-and-handling means.

* * * * *